United States Patent
Allen-Hoffmann et al.

(10) Patent No.: US 10,743,533 B2
(45) Date of Patent: Aug. 18, 2020

(54) COLD STORAGE OF ORGANOTYPICALLY CULTURED SKIN EQUIVALENTS FOR CLINICAL APPLICATIONS

(71) Applicant: STRATATECH CORPORATION, Madison, WI (US)

(72) Inventors: B. Lynn Allen-Hoffmann, Madison, WI (US); John Pirnstill, Fitchburg, WI (US)

(73) Assignee: Stratatech Corporation, Madison, WI (US)

(*) Notice: Subject to any disclaimer, the term of this patent is extended or adjusted under 35 U.S.C. 154(b) by 0 days.

(21) Appl. No.: 15/375,755

(22) Filed: Dec. 12, 2016

(65) Prior Publication Data
US 2017/0339943 A1   Nov. 30, 2017

Related U.S. Application Data

(63) Continuation of application No. 12/271,455, filed on Nov. 14, 2008, now abandoned.

(60) Provisional application No. 60/987,911, filed on Nov. 14, 2007.

(51) Int. Cl.
*A01N 1/02* (2006.01)

(52) U.S. Cl.
CPC .............. *A01N 1/02* (2013.01); *A01N 1/0231* (2013.01); *A01N 1/0263* (2013.01); *A01N 1/0273* (2013.01)

(58) Field of Classification Search
CPC ...... A01N 1/02; A01N 1/0273; A01N 1/0231; A01N 1/0263
USPC .......................................................... 206/438
See application file for complete search history.

(56) References Cited

U.S. PATENT DOCUMENTS

| | | |
|---|---|---|
| 4,485,096 A | 11/1984 | Bell |
| 5,536,656 A | 7/1996 | Kemp |
| 5,658,331 A | 8/1997 | Della Valle et al. |
| 5,693,332 A | 12/1997 | Hansborough |
| 5,843,766 A | 1/1998 | Applegate et al. |
| 5,989,837 A | 11/1999 | Allen-Hoffman et al. |
| 6,039,760 A | 9/2000 | Eisenberg |
| 6,146,883 A | 11/2000 | Grass |
| 6,214,567 B1 | 4/2001 | Allen-Hoffman |
| 6,485,724 B2 | 11/2002 | Allen-Hoffman |
| 6,495,135 B2 | 12/2002 | Allen-Hoffman |
| 6,514,711 B2 | 2/2003 | Allen-Hoffman |
| 6,974,697 B2 | 12/2005 | Comer |
| 7,407,805 B2 | 8/2008 | Comer |
| 7,462,448 B2 | 12/2008 | Allen-Hoffman |

(Continued)

FOREIGN PATENT DOCUMENTS

| | | |
|---|---|---|
| JP | 2003-070460 | 3/2003 |
| JP | 2002-570751 | 9/2009 |

(Continued)

OTHER PUBLICATIONS

Kubilus, Joseph, et al., "Full Thickness EpiDerm: A Dermal-Epidermal Skin Model to Study Epithelial-Mesenchymal Interactions," ATLA (2004), Supplement 1, vol. 32, pp. 75-82.

(Continued)

*Primary Examiner* — Ernesto A Grano

(57) ABSTRACT

The present invention relates generally to systems and methods for storing, shipping and using skin equivalents made by organotypic culture. In particular, the present invention relates to systems and methods for producing, transporting, storing and using skin equivalents produced by organotypic culture at reduced temperatures, preferably from 2-8 degrees Celsius. The methods include sterile packaging of the grafts so that the sterility and integrity of the package is maintained until the time of use for grafting purposes.

13 Claims, 8 Drawing Sheets

(56) References Cited

U.S. PATENT DOCUMENTS

| | | |
|---|---|---|
| 7,498,167 B2 | 3/2009 | Comer |
| 7,501,238 B2 | 3/2009 | Comer |
| 7,541,188 B2 | 6/2009 | Conrad |
| 7,674,291 B2 | 3/2010 | Centanni |
| 7,807,148 B2 | 10/2010 | Comer |
| 7,888,496 B2 | 2/2011 | Allen-Hoffman |
| 7,915,042 B2 | 3/2011 | Comer |
| 7,955,790 B2 | 6/2011 | Comer |
| 7,988,959 B2 | 8/2011 | Allen-Hoffman |
| 2004/0043481 A1 | 3/2004 | Wilson |
| 2006/0222635 A1 | 10/2006 | Centanni |
| 2006/0257383 A1 | 11/2006 | Allen-Hoffman |
| 2006/0258001 A1 | 11/2006 | Allen-Hoffman |
| 2009/0145087 A1 | 6/2009 | Allen-Hoffman |
| 2010/0119495 A1 | 5/2010 | Centanni |
| 2010/0119615 A1 | 5/2010 | Comer |
| 2010/0330046 A1 | 12/2010 | Comer |

FOREIGN PATENT DOCUMENTS

| | | |
|---|---|---|
| WO | 93/08776 | 5/1993 |
| WO | 01/05942 | 1/2001 |
| WO | 02/070729 | 9/2002 |
| WO | 03/093418 | 11/2003 |
| WO | 04/110372 | 2/2004 |
| WO | 04/013606 | 12/2004 |
| WO | 05/012492 | 2/2005 |
| WO | 06/055931 | 2/2005 |
| WO | 06/094070 | 5/2006 |
| WO | 06/101834 | 9/2006 |
| WO | 09/065005 | 5/2009 |
| WO | 10/035948 | 5/2010 |
| WO | 10/135655 | 11/2010 |

OTHER PUBLICATIONS

Allen-Hoffman, et al., 2000, "Normal growth and differentiation in a spontaneously immortalized near-diploid human keratinocyte cell line, NIKS," J. Invest. Dermatol., 114(3): 444-55.

Asbill, et al., 2000, "Evaluation of a human bio-engineered skin equivalent for drug permeation studies," Pharm. Research, 17(9): 1092-97.

Auger, et al., 2000, "Multistep production of bioengineered skin substitutes: sequential modulation of culture conditions," In Vitro Cell Dev. Biol. Anim., 36(2): 96-103.

Baden, 1987, "Isolation and characterization of a spontaneously arising long-lived line of human keratinocytes (NM1)," In Vitro Cell Dev. Biol, 23(3): 205-13.

Boukamp, et al., 1988, "Normal keratinization in a spontaneously immortalized aneuploid human keratinocyte cell line," J. Cell. Biol., 106:761-71.

Cook, et al., 1995, "Cold-Storage of Synthetic Human Epidermis in HypoThermosol," Tissue Engineering, 1(4): 361-77.

Meana, et al., 1998, "Large surface of cultured human epithelium obtained on a dermal matrix based on live fibroblast-containing fibrin gels," Burns, 24:621-30.

Myers, et al., 1995, "Transplantation of keratinocytes in the treatment of wounds," Am. J. Surg., 170(1): 75-83.

Robb, et al., 2001, "Storage media and temperature maintain normal anatomy of cadaveric human skin for transplantation to full-thickness skin wounds," J. Burn. Care Rehab., 22(/\): 393-96.

Extended European Search Report dated Jan. 30, 2013, EP Patent Application No. 08850430.3.

JP Patent Application No. 2010-534213 Notice of Reasons for Rejection dated Sep. 26, 2013 and English translation.

Gresham, et al., 1963, "Practical Methods for Short-Term Storage of Homografts," Archives of Surgery, vol. 87, 418-421.

Skoog, Tord, 1954, "An Experimental and Clinical Investigation of the Effect of Low Temperature of the Viability of Excized Skin," Plast. Reconstr. Surg., 14(6): 403-16.

Hurst, et al., 1984, "Prolonged Life and Improved Quality for Stored Skin Grafts," Plast. Reconstr. Surg., 73(1): 105-10.

Allgower, et al., 1952, "Viability of Skin in Relation to Various Methods of Storage," Tex. Rep. Biol. Med., 10(1): 3-21.

Matthews et al., 1945, "Storage of Autogenous Grafts," Lancet, 245(6356): 775.

FIG. 7

Day 28 QC Tissue

| Tissue Number | Location | A550 | Tissue Average | Group Average |
|---|---|---|---|---|
| SG-031008-21 Tissue 1 | Center | 0.960 | 0.892 | 0.908 |
| | Edge | 0.834 | | |
| | Edge | 0.876 | | |
| | Edge | 0.897 | | |
| SG-031008-21 Tissue 2 | Center | 0.967 | 0.905 | |
| | Edge | 0.903 | | |
| | Edge | 0.867 | | |
| | Edge | 0.883 | | |
| SG-031008-21 Tissue 3 | Center | 0.898 | 0.928 | |
| | Edge | 0.955 | | |
| | Edge | 0.855 | | |
| | Edge | 1.004 | | |
| SG-031708-20 Tissue 1 | Center | 0.996 | 1.059 | 1.064 |
| | Edge | 1.134 | | |
| | Edge | 1.007 | | |
| | Edge | 1.100 | | |
| SG-031708-20 Tissue 2 | Center | 1.060 | 1.062 | |
| | Edge | 1.062 | | |
| | Edge | 1.031 | | |
| | Edge | 1.096 | | |
| SG-031708-20 Tissue 3 | Center | 1.091 | 1.070 | |
| | Edge | 0.929 | | |
| | Edge | 1.143 | | |
| | Edge | 1.116 | | |
| SG-031708-21 Tissue 1 | Center | 0.954 | 0.968 | 0.970 |
| | Edge | 0.976 | | |
| | Edge | 0.924 | | |
| | Edge | 1.017 | | |
| SG-031708-21 Tissue 2 | Center | 1.037 | 0.990 | |
| | Edge | 0.920 | | |
| | Edge | 0.982 | | |
| | Edge | 1.021 | | |
| SG-031708-21 Tissue 3 | Center | 1.018 | 0.954 | |
| | Edge | 0.877 | | |
| | Edge | 1.041 | | |
| | Edge | 0.878 | | |
| SG-042408-21 Tissue 1 | Center | 0.944 | 0.980 | 0.980 |
| | Edge | 0.990 | | |
| | Edge | 0.939 | | |
| | Edge | 1.046 | | |

Stored 8 Days at 2 - 8 C

| Tissue Number | Location | A550 | Tissue Average | Group Average | % of Day 28 |
|---|---|---|---|---|---|
| SG-031008-21 Tissue 1 | Center | 0.818 | 0.821 | 0.828 | 91 |
| | Edge | 0.754 | | | |
| | Edge | 0.844 | | | |
| | Edge | 0.869 | | | |
| SG-031008-21 Tissue 2 | Center | 0.816 | 0.836 | | |
| | Edge | 0.907 | | | |
| | Edge | 0.786 | | | |
| | Edge | ??? | | | |
| SG-031708-20 Tissue 1 | Center | 0.961 | 0.938 | 0.948 | 89 |
| | Edge | 0.948 | | | |
| | Edge | 0.918 | | | |
| | Edge | 0.924 | | | |
| SG-031708-20 Tissue 2 | Center | 0.963 | 0.959 | | |
| | Edge | 0.959 | | | |
| | Edge | 0.960 | | | |
| | Edge | 0.954 | | | |
| SG-031708-21 Tissue 1 | Center | 0.789 | 0.807 | 0.823 | 85 |
| | Edge | 0.818 | | | |
| | Edge | 0.809 | | | |
| | Edge | 0.810 | | | |
| SG-031708-21 Tissue 2 | Center | 0.878 | 0.840 | | |
| | Edge | 0.823 | | | |
| | Edge | 0.823 | | | |
| | Edge | 0.837 | | | |
| SG-042408-21 Tissue 1 | Center | 0.812 | 0.818 | 0.813 | 83 |
| | Edge | 0.826 | | | |
| | Edge | 0.814 | | | |
| | Edge | 0.818 | | | |
| SG-042408-21 Tissue 2 | Center | 0.826 | 0.822 | | |
| | Edge | 0.810 | | | |
| | Edge | 0.823 | | | |
| | Edge | 0.830 | | | |
| SG-042408-21 Tissue 3 | Center | 0.800 | 0.800 | | |
| | Edge | 0.777 | | | |
| | Edge | 0.797 | | | |
| | Edge | 0.825 | | | |

Stored 15 Days at 2 - 8 C

| Tissue Number | Location | A550 | Tissue Average | Group Average | % of Day 28 |
|---|---|---|---|---|---|
| SG-031008-21 Tissue 3 | Center | 0.711 | 0.755 | 0.754 | 83 |
| | Edge | 0.752 | | | |
| | Edge | 0.776 | | | |
| | Edge | 0.781 | | | |
| SG-031008-21 Tissue 4 | Center | 0.700 | 0.754 | | |
| | Edge | 0.726 | | | |
| | Edge | 0.818 | | | |
| | Edge | 0.770 | | | |
| SG-031708-20 Tissue 3 | Center | 0.739 | 0.748 | 0.743 | 70 |
| | Edge | 0.748 | | | |
| | Edge | 0.762 | | | |
| | Edge | 0.742 | | | |
| SG-031708-20 Tissue 4 | Center | 0.745 | 0.739 | | |
| | Edge | 0.730 | | | |
| | Edge | 0.715 | | | |
| | Edge | 0.764 | | | |
| SG-042408-21 Tissue 1 | Center | 0.659 | 0.767 | 0.741 | 76 |
| | Edge | 0.830 | | | |
| | Edge | 0.774 | | | |
| | Edge | 0.803 | | | |
| SG-042408-21 Tissue 2 | Center | 0.608 | 0.746 | | |
| | Edge | 0.636 | | | |
| | Edge | 0.758 | | | |
| | Edge | 0.783 | | | |
| SG-042408-21 Tissue 3 | Center | 0.551 | 0.711 | | |
| | Edge | 0.776 | | | |
| | Edge | 0.799 | | | |
| | Edge | 0.718 | | | |

FIG. 8

Day 28 QC Tissue

| Tissue Number | Location | Initial DPM | Tissue Average | Group Average | Initial DPM | Tissue Average | Group Average |
|---|---|---|---|---|---|---|---|
| SG-031008-21 Tissue 1 | Center | 90 | 106 | 109 | 20 | 105 | 107 |
| | Edge | 124 | | | 170 | | |
| | Edge | 98 | | | 74 | | |
| | Edge | 110 | | | 154 | | |
| SG-031008-21 Tissue 2 | Center | 110 | 116 | | 110 | 125 | |
| | Edge | 106 | | | 116 | | |
| | Edge | 94 | | | 46 | | |
| | Edge | 154 | | | 226 | | |
| SG-031008-21 Tissue 3 | Center | 110 | 105 | | 154 | 92 | |
| | Edge | 102 | | | 74 | | |
| | Edge | 106 | | | 86 | | |
| | Edge | 102 | | | 54 | | |
| SG-031708-20 Tissue 1 | Center | 98 | 107 | 105 | 380 | 432 | 343 |
| | Edge | 80 | | | 472 | | |
| | Edge | 122 | | | 496 | | |
| | Edge | 118 | | | 378 | | |
| SG-031708-20 Tissue 2 | Center | 114 | 104 | | 314 | 345 | |
| | Edge | 110 | | | 456 | | |
| | Edge | 98 | | | 220 | | |
| | Edge | 94 | | | 388 | | |
| SG-031708-20 Tissue 3 | Center | 114 | 105 | | 296 | 254 | 370 |
| | Edge | 96 | | | 250 | | |
| | Edge | 106 | | | 284 | | |
| | Edge | 104 | | | 184 | | |
| SG-031708-21 Tissue 1 | Center | 100 | 102 | 107 | 532 | 462 | |
| | Edge | 94 | | | 526 | | |
| | Edge | 112 | | | 378 | | |
| | Edge | 102 | | | 410 | | |
| SG-031708-21 Tissue 2 | Center | 114 | 109 | | 312 | 364 | |
| | Edge | 94 | | | 384 | | |
| | Edge | 90 | | | 402 | | |
| | Edge | 138 | | | 358 | | |
| SG-031708-21 Tissue 3 | Center | 102 | 111 | | 296 | 284 | |
| | Edge | 104 | | | 204 | | |
| | Edge | 128 | | | 314 | | |
| | Edge | 110 | | | 322 | | |
| SG-042408-21 Tissue 1 | Center | 112 | 135 | 135 | 206 | 208 | 208 |
| | Edge | 138 | | | 192 | | |
| | Edge | 156 | | | 216 | | |
| | Edge | 134 | | | 218 | | |

Stored 8 Days

| Tissue Number | Location | Initial DPM | Tissue Average | Group Average |
|---|---|---|---|---|
| SG-031008-21 Tissue 1 | Center | 92 | 147 | 141 |
| | Edge | 140 | | |
| | Edge | 166 | | |
| | Edge | 190 | | |
| SG-031008-21 Tissue 2 | Center | 120 | 135 | |
| | Edge | 174 | | |
| | Edge | 116 | | |
| | Edge | 128 | | |
| SG-031708-20 Tissue 1 | Center | 90 | 117 | 121 |
| | Edge | 98 | | |
| | Edge | 156 | | |
| | Edge | 124 | | |
| SG-031708-20 Tissue 2 | Center | 194 | 126 | |
| | Edge | 100 | | |
| | Edge | 94 | | |
| | Edge | 116 | | |
| SG-031708-21 Tissue 1 | Center | 108 | 115 | 130 |
| | Edge | 150 | | |
| | Edge | 112 | | |
| | Edge | 90 | | |
| SG-031708-21 Tissue 2 | Center | 120 | 146 | |
| | Edge | 114 | | |
| | Edge | 190 | | |
| | Edge | 158 | | |
| SG-042408-21 Tissue 1 | Center | 92 | 97 | 116 |
| | Edge | 90 | | |
| | Edge | 112 | | |
| | Edge | 94 | | |
| SG-042408-21 Tissue 2 | Center | 120 | 127 | |
| | Edge | 110 | | |
| | Edge | 116 | | |
| | Edge | 162 | | |
| SG-042408-21 Tissue 3 | Center | 96 | 124 | |
| | Edge | 120 | | |
| | Edge | 136 | | |
| | Edge | 144 | | |

(Initial DPM / Tissue Average / Group Average continued for Stored 8 Days):

| | Initial DPM | Tissue Average | Group Average |
|---|---|---|---|
| | 556 | 487 | 435 |
| | 442 | | |
| | 458 | | |
| | 492 | | |
| | 318 | 383 | |
| | 360 | | |
| | 406 | | |
| | 448 | | |
| | 246 | 346 | 367 |
| | 298 | | |
| | 390 | | |
| | 448 | | |
| | 308 | 389 | |
| | 352 | | |
| | 528 | | |
| | 368 | | |
| | 360 | 362 | 350 |
| | 340 | | |
| | 382 | | |
| | 366 | | |
| | 348 | 338 | |
| | 360 | | |
| | 326 | | |
| | 318 | | |
| | 166 | 209 | 207 |
| | 226 | | |
| | 208 | | |
| | 234 | | |
| | 186 | 214 | |
| | 240 | | |
| | 210 | | |
| | 220 | | |
| | 220 | 199 | |
| | 170 | | |
| | 190 | | |
| | 214 | | |

Stored 15 Days

| Tissue Number | Location | Initial DPM | Tissue Average | Group Average | Initial DPM | Tissue Average | Group Average |
|---|---|---|---|---|---|---|---|
| SG-031008-21 Tissue 3 | Center | 224 | 174 | 160 | 368 | 430 | 427 |
| | Edge | 214 | | | 360 | | |
| | Edge | 136 | | | 502 | | |
| | Edge | 118 | | | 490 | | |
| SG-031008-21 Tissue 4 | Center | 112 | 146 | | 444 | 423 | |
| | Edge | 116 | | | 398 | | |
| | Edge | 96 | | | 502 | | |
| | Edge | 258 | | | 348 | | |
| SG-031708-20 Tissue 3 | Center | 232 | 152 | 171 | 370 | 460 | 401 |
| | Edge | 198 | | | 492 | | |
| | Edge | 162 | | | 466 | | |
| | Edge | 104 | | | 512 | | |
| SG-031708-20 Tissue 4 | Center | 194 | 191 | | 320 | 343 | |
| | Edge | 164 | | | 390 | | |
| | Edge | 188 | | | 330 | | |
| | Edge | 220 | | | 330 | | |
| SG-042408-21 Tissue 1 | Center | 124 | 160 | 148 | 178 | 246 | 273 |
| | Edge | 166 | | | 262 | | |
| | Edge | 194 | | | 240 | | |
| | Edge | 154 | | | 302 | | |
| SG-042408-21 Tissue 2 | Center | 94 | 115 | | 346 | 325 | |
| | Edge | 140 | | | 266 | | |
| | Edge | 92 | | | 356 | | |
| | Edge | 132 | | | 330 | | |
| SG-042408-21 Tissue 3 | Center | 176 | 171 | | 250 | 248 | |
| | Edge | 118 | | | 304 | | |
| | Edge | 204 | | | 218 | | |
| | Edge | 184 | | | 218 | | |

# COLD STORAGE OF ORGANOTYPICALLY CULTURED SKIN EQUIVALENTS FOR CLINICAL APPLICATIONS

CROSS REFERENCE TO RELATED APPLICATIONS

This application is a continuation of U.S. patent application Ser. No. 12/271,455, filed Nov. 14, 2008, which claims the benefit of U.S. Prov. Appl. 60/987,911 filed Nov. 14, 2007, the entire contents of which are incorporated by reference herein.

STATEMENT REGARDING FEDERALLY SPONSORED RESEARCH OR DEVELOPMENT

This invention was made with government support under grant number NIST 70NANB3H3011 awarded by the Advanced Technology Program. The government has certain rights in the invention.

FIELD OF THE INVENTION

The present invention relates generally to systems and methods for shipping and storing skin equivalents made by organotypic culture that are to be used for skin grafting to human patients.

BACKGROUND

The emerging field of tissue engineering (TE) is poised to make enormous progress in the treatment of organ disease and dysfunction in the coming decade. In 2001, there were 23 cell-based therapeutics approved for market in the United States (U.S.) and Europe, of which nine were skin substitutes or grafts, and 100 more products were in development. (De Bree, Genomics-based Drug Data Report and Regenerative Therapy (1)2:77-96 (2001)). In 2007, nearly 100 companies were involved in developing engineered tissues, cell-based therapeutics, or related technologies (Applied Data Research, February 2007). Overall the industry had an annual growth rate of 16% from 1995-2001. The "structural" industry segment (e.g., skin, bone, cartilage) showed 85% growth from 1998-2001. In 2004, the U.S. market for tissue-engineered skin replacements/substitutes and active wound repair modulators was valued at approximately $195 million. Sales are expected to increase at a compound annual rate of 9.5%, reaching approximately $481 million in the year 2014 (MedTech Insight, Windhover Information, September 2005). The total U.S. market for advanced wound care technologies was worth more than $2.3 billion in 2005. By the end of 2006 the market will reach almost $2.6 billion, and over a five-year period will grow at an average annual growth rate of 12.3% to reach $4.6 billion in 2011 (BCC Research, PHM011E, January 2007). The global wound care market is estimated to be worth US$7.2 billion in 2006 and comprises two sectors, traditional and advanced (Espicom Business Intelligence, 2007). Traditional wound care products consist mainly of low technology gauze-based dressings such as woven and non-woven sponges, conforming bandages and non-adherent bandages. The advanced wound care segment (US$4.1 billion global) is the fastest growing area with double-digit growth of 10% per year (Espicom Business Intelligence, 2007).

Although a multitude of revolutionary and economically important applications for engineered tissues and organs exist in the human health arena, the full economic potential of the industry is far from realized. At present, only one of the publicly-held tissue engineering companies worldwide has shown a profit despite global investment in these technologies exceeding $3.5 billion. (Lysaght and Reyes, Tissue Engineering 7(5):485-93 (2001)).

A major impediment to the acceptance of engineered tissues by medical practitioners, healthcare providers, and second party payers is the lack of a means to effectively and efficiently preserve engineered tissues. The nature of living cells and tissue products makes them impractical for long-term storage. Current engineered tissues must often be stored and shipped under carefully controlled conditions to maintain viability and function. Typically, engineered tissue products take weeks or months to produce but must be used within hours or days after manufacture. As a result, TE companies must continually operate with their production facilities at top capacity and absorb the costs of inventory losses (i.e., unsold product which must be discarded). These inventory losses, on top of already costly manufacturing process, have forced prices to impractical levels. As one specific example, APLIGRAF requires about four weeks to manufacture, is usable for less than ten days and must be maintained between 20 and 23° C. until used. As another example, EPICEL is transported by a nurse from Cambridge, Mass. to the point-of-use in a portable incubator and is used immediately upon arrival. Such constraints represent significant challenges to developing convenient and cost-effective products.

Cryopreservation has been explored as a solution to the storage problem, but it is known to induce tissue damage through ice formation, chilling injury, and osmotic balance. Besides APLIGRAF, the only other approved living skin equivalent, ORCEL, is currently in clinical trials as a frozen product but has the drawback that it must be maintained at temperatures below $-100°$ C. prior to use. This means using liquid nitrogen storage, which is expensive, dangerous, and not universally available (e.g. rural clinics and field hospitals). Moreover, delivering a frozen product requires special training on the part of the end-user to successfully thaw the tissue prior to use.

Accordingly, what is needed in the art are improved methods of preparing engineered tissues and cells for storage under conditions that are routinely available at the point of use. As all clinical facilities have refrigerated storage, development of a skin equivalent that can be stored for prolonged periods in a standard refrigerator would greatly improve the availability and clinical utility of these products.

SUMMARY OF THE INVENTION

In some embodiments, the present invention provides methods of shipping an organotypically cultured skin equivalent to a user and using the skin equivalent in a skin grafting procedure on a human patient comprising: providing the organotypically cultured skin equivalent comprising dermal and epidermal layers and a sterile package comprising a gel support; packaging the skin equivalent in a sterile package under sterile conditions so that the skin equivalent contacts the gel support; lowering the temperature of the sterile package to 2-8 degrees Celsius; shipping the sterile package to a user at 2-8 degrees Celsius; storing the sterile package at the site of use at 2-8 degrees Celsius wherein the sterility and integrity of the sterile package are maintained; and removing the organotypically cultured skin equivalent from the package and applying to a patient without an intervening culture step. The present invention is not limited to skin equivalents comprising any particular types of keratinocytes. In some embodiments, the organotypically cultured skin equivalent comprises NIKS cells. The present invention is not limited to any particular type of gel support. In some embodiments, the gel support is an agarose gel support. The present invention is not limited to any particular type of sterile package. In some embodiments, the sterile package is heat sealable. In further embodiments, the skin equivalent contacts the gel support via a permeable membrane.

In some embodiments, the present invention provides methods of shipping and storing an organotypically cultured skin equivalent for use in a skin grafting procedure comprising: providing the organotypically cultured skin equivalent comprising dermal and epidermal layers and a sterile package comprising a gel support; packaging the skin equivalent in a sterile package under sterile conditions so that the skin equivalent contacts the gel support on a packaging date; lowering the temperature of the sterile package to 2-8 degrees Celsius; shipping the sterile package to a user at 2-8 degrees Celsius; storing the sterile package at the site of use at 2-8 degrees Celsius wherein the sterility and integrity of the sterile package are maintained for from 8 to 15 days from the packaging date. The present invention is not limited to skin equivalents comprising any particular types of keratinocytes. In some embodiments, the organotypically cultured skin equivalent comprises NIKS cells. The present invention is not limited to any particular type of gel support. In some embodiments, the gel support is an agarose gel support. The present invention is not limited to any particular type of sterile package. In some embodiments, the sterile package is heat sealable. In further embodiments, the skin equivalent contacts the gel support via a permeable membrane.

In some embodiments, the present invention provides methods of shipping an organotypically cultured skin equivalent to a user for use in a skin grafting procedure comprising: providing the organotypically cultured skin equivalent comprising dermal and epidermal layers and a sterile package comprising a gel support, wherein the gel support is formed with a minimal media; packaging the skin equivalent in a sterile package under sterile conditions so that the skin equivalent contacts the gel support; lowering the temperature of the sterile package to 2-8 degrees Celsius; shipping the sterile package to a user at 2-8 degrees Celsius; storing the sterile package at the site of use 2-8 degrees Celsius wherein the sterility and integrity of the sterile package are maintained. The present invention is not limited to skin equivalents comprising any particular types of keratinocytes. In some embodiments, the organotypically cultured skin equivalent comprises NIKS cells. The present invention is not limited to any particular type of gel support. In some embodiments, the gel support is an agarose gel support. The present invention is not limited to any particular type of sterile package. In some embodiments, the sterile package is heat sealable. In further embodiments, the skin equivalent contacts the gel support via a permeable membrane.

In some embodiments, the present invention provides kits comprising: a shipping chamber comprising a gel support comprising a minimal media; a skin equivalent supported on a permeable membrane in contact with the gel support; wherein the shipping chamber is contained with a sterile pouch. The present invention is not limited to skin equivalents comprising any particular types of keratinocytes. In some embodiments, the organotypically cultured skin equivalent comprises NIKS cells. The present invention is not limited to any particular type of gel support. In some embodiments, the gel support is an agarose gel support. The present invention is not limited to any particular type of sterile package. In some embodiments, the sterile package is heat sealable. In further embodiments, the skin equivalent contacts the gel support via a permeable membrane.

In some embodiments, the present invention further provides articles of manufacture comprising a shipping chamber comprising a chamber top and a chamber bottom having a surface having thereon a gel support, said article further comprising a skin equivalent on a permeable membrane, said permeable membrane in contact with said gel support, said article further comprising extensions extending from said chamber top so that when said chamber top is placed on said chamber bottom said skin equivalent is secured against said gel support. In some embodiments, the gel support is formed with minimal media.

DESCRIPTION OF FIGURES

FIG. 7 is a table presenting viability data.

FIG. 8 is a table presenting barrier function summary data.

DEFINITIONS

Figure 1:
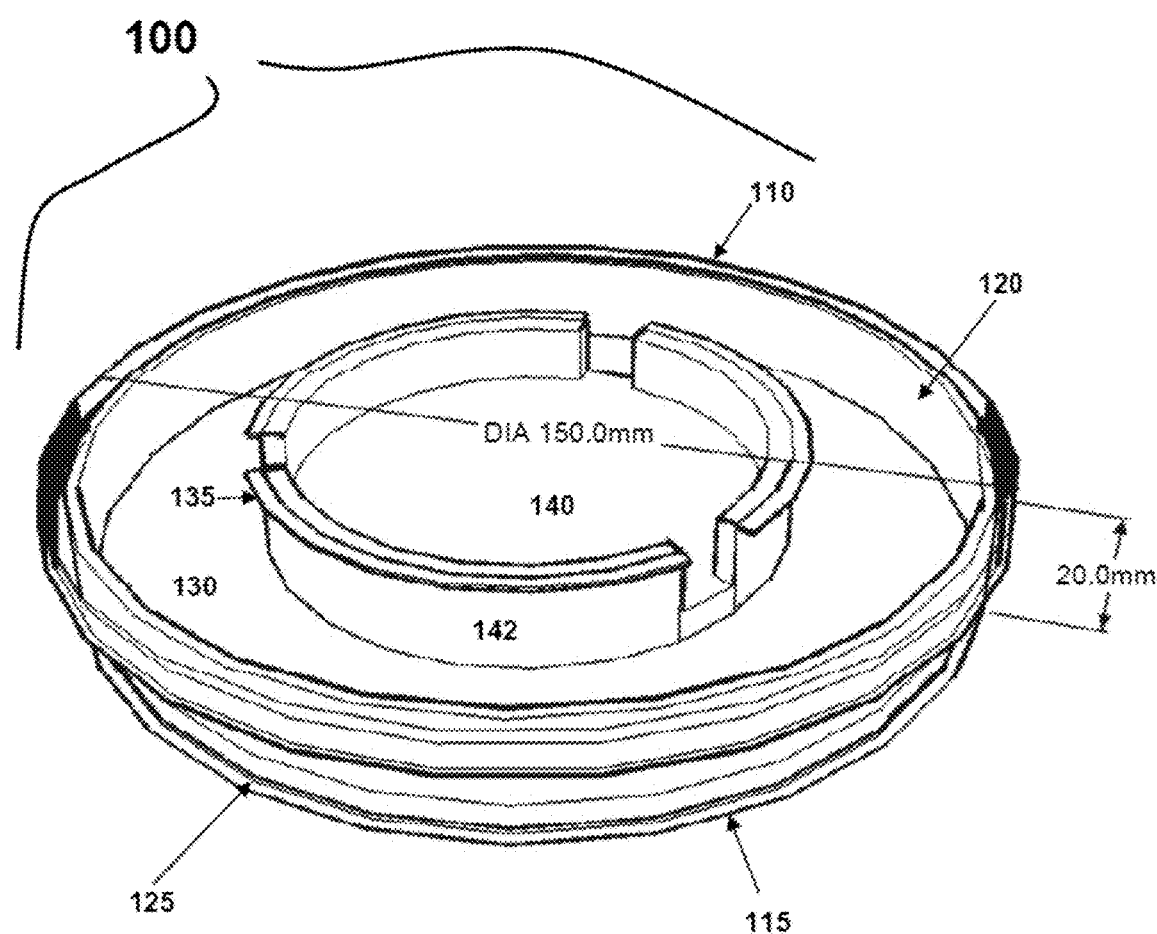
FIG. 1 depicts a shipping chamber of the present invention.

As used herein, the terms "human skin equivalent" and "human skin substitute" are used interchangeably to refer to an in vitro derived culture of keratinocytes that has stratified into squamous epithelia. Typically, the skin equivalents are produced by organotypic culture and include a dermal layer in addition to a keratinocyte layer.

As used herein, the term "NIKS® cells" refers to cells having the characteristics of the cells deposited as cell line ATCC CRL-1219.

The term "homology" refers to a degree of complementarity. There may be partial homology or complete homology (i.e., identity). A partially complementary sequence is one that at least partially inhibits a completely complementary sequence from hybridizing to a target nucleic acid and is referred to using the functional term "substantially homologous." The term "inhibition of binding," when used in reference to nucleic acid binding, refers to inhibition of binding caused by competition of homologous sequences for binding to a target sequence. The inhibition of hybridization of the completely complementary sequence to the target sequence may be examined using a hybridization assay (Southern or Northern blot, solution hybridization and the like) under conditions of low stringency. A substantially homologous sequence or probe will compete for and inhibit the binding (i.e., the hybridization) of a completely homologous to a target under conditions of low stringency. This is not to say that conditions of low stringency are such that non-specific binding is permitted; low stringency conditions require that the binding of two sequences to one another be a specific (i.e., selective) interaction. The absence of non-specific binding may be tested by the use of a second target that lacks even a partial degree of complementarity (e.g., less than about 30% identity); in the absence of non-specific binding the probe will not hybridize to the second non-complementary target.

The term "gene" refers to a nucleic acid (e.g., DNA) sequence that comprises coding sequences necessary for the production of a polypeptide or precursor (e.g., KGF-2). The polypeptide can be encoded by a full length coding sequence or by any portion of the coding sequence so long as the desired activity or functional properties (e.g., enzymatic activity, ligand binding, signal transduction, etc.) of the full-length or fragment are retained. The term also encompasses the coding region of a structural gene and the including sequences located adjacent to the coding region on both the 5' and 3' ends for a distance of about 1 kb on either end such that the gene corresponds to the length of the full-length mRNA. The sequences that are located 5' of the coding region and which are present on the mRNA are referred to as 5' untranslated sequences. The sequences that are located 3' or downstream of the coding region and that are present on the mRNA are referred to as 3' untranslated sequences. The term "gene" encompasses both cDNA and genomic forms of a gene. A genomic form or clone of a gene contains the coding region interrupted with non-coding sequences termed "introns" or "intervening regions" or "intervening sequences." Introns are segments of a gene that are transcribed into nuclear RNA (hnRNA); introns may contain regulatory elements such as enhancers. Introns are removed or "spliced out" from the nuclear or primary transcript; introns therefore are absent in the messenger RNA (mRNA) transcript. The mRNA functions during translation to specify the sequence or order of amino acids in a nascent polypeptide.

As used herein, the terms "nucleic acid molecule encoding," "DNA sequence encoding," and "DNA encoding" refer to the order or sequence of deoxyribonucleotides along a strand of deoxyribonucleic acid. The order of these deoxyribonucleotides determines the order of amino acids along the polypeptide (protein) chain. The DNA sequence thus codes for the amino acid sequence.

As used herein, the term "recombinant DNA molecule" as used herein refers to a DNA molecule that is comprised of segments of DNA joined together by means of molecular biological techniques.

As used herein, the term "purified" or "to purify" refers to the removal of contaminants from a sample.

As used herein, the term "vector" is used in reference to nucleic acid molecules that transfer DNA segment(s) from one cell to another. The term "vehicle" is sometimes used interchangeably with "vector."

The term "expression vector" as used herein refers to a recombinant DNA molecule containing a desired coding sequence and appropriate nucleic acid sequences necessary for the expression of the operably linked coding sequence in a particular host organism. Nucleic acid sequences necessary for expression in prokaryotes usually include a promoter, an operator (optional), and a ribosome binding site, often along with other sequences. Eukaryotic cells are known to utilize promoters, enhancers, and termination and polyadenylation signals.

"Operably linked" refers to a juxtaposition wherein the components so described are in a relationship permitting them to function in their intended manner. A regulatory sequence is "operably linked" to a coding sequence when it is joined in such a way that expression of the coding sequence is achieved under conditions compatible with the regulatory sequence.

The term "transfection" as used herein refers to the introduction of foreign DNA into eukaryotic cells. Transfection may be accomplished by a variety of means known to the art including calcium phosphate-DNA co-precipitation, DEAE-dextran-mediated transfection, polybrene-mediated transfection, electroporation, microinjection, liposome fusion, lipofection, protoplast fusion, retroviral infection, and biolistics.

The term "stable transfection" or "stably transfected" refers to the introduction and integration of foreign DNA into the genome of the transfected cell. The term "stable transfectant" refers to a cell that has stably integrated foreign DNA into the genomic DNA.

The term "transient transfection" or "transiently transfected" refers to the introduction of foreign DNA into a cell where the foreign DNA fails to integrate into the genome of the transfected cell. The foreign DNA persists in the nucleus of the transfected cell for several days. During this time the foreign DNA is subject to the regulatory controls that govern the expression of endogenous genes in the chromosomes. The term "transient transfectant" refers to cells that have taken up foreign DNA but have failed to integrate this DNA.

DETAILED DESCRIPTION

The present invention relates generally to systems and methods for shipping and storing skin equivalents made by organotypic culture that are to be used for skin grafting to human patients. In particular, the present invention relates to methods for production and packaging of a sterile skin equivalent using aseptic techniques and maintaining the sterility of the skin equivalent during storage for up to 15 days until opened in a sterile surgical field for clinical use. For convenience, the description of the invention is presented in the following sections:

A) Skin Equivalents Produced by Organotypic Culture

The present invention is not limited to the use of any particular source of cells that are capable of differentiating into squamous epithelia. Indeed, the present invention contemplates the use of a variety of cell lines and sources that can differentiate into squamous epithelia, including both primary and immortalized keratinocytes. Sources of cells include keratinocytes and dermal fibroblasts biopsied from humans and cavaderic donors (Auger et al., In Vitro Cell. Dev. Biol.—Animal 36:96-103; U.S. Pat. Nos. 5,968,546 and 5,693,332, each of which is incorporated herein by reference), neonatal foreskins (Asbill et al., Pharm. Research 17(9): 1092-97 (2000); Meana et al., Burns 24:621-30 (1998); U.S. Pat. Nos. 4,485,096; 6,039,760; and 5,536,656, each of which is incorporated herein by reference), and immortalized keratinocytes cell lines such as NM1 cells (Baden, In Vitro Cell. Dev. Biol. 23(3):205-213 (1987)), HaCaT cells (Boucamp et al., J. cell. Boil. 106:761-771 (1988)); and NIKS® cells (Cell line BC-1-Ep/SL; U.S. Pat. No. 5,989,837, incorporated herein by reference; ATCC CRL-12191). Each of these cell lines can be cultured or genetically modified as in order to produce a cell line capable of expressing or co-expressing the desired protein(s). In particularly preferred embodiments, NIKS® cells are utilized. The discovery of a novel human keratinocyte cell line (near-diploid immortalized keratinocytes or NIKS®) provides an opportunity to genetically engineer human keratinocytes. A unique advantage of the NIKS® cells is that they are a consistent source of genetically-uniform, pathogen-free human keratinocytes. For this reason, they are useful for the application of genetic engineering and genomic gene expression approaches to provide skin equivalent cultures with properties more similar to human skin. The NIKS® keratinocyte cell line, identified and characterized at the University of Wisconsin, is nontumorigenic, exhibits a stable karyotype, and exhibits normal differentiation both in monolayer and organotypic culture. NIKS® cells form fully stratified skin equivalents in culture. These cultures are indistinguishable by all criteria tested thus far from organotypic cultures formed from primary human keratinocytes. Unlike primary cells however, the immortalized NIKS® cells will continue to proliferate in monolayer culture indefinitely. This provides an opportunity to genetically manipulate the cells and isolate new clones of cells with new useful properties (Allen-Hoffmann et al., J. Invest. Dermatol., 114(3): 444-455 (2000)).

The NIKS® cells arose from the BC-1-Ep strain of human neonatal foreskin keratinocytes isolated from an apparently normal male infant. In early passages, the BC-1-Ep cells exhibited no morphological or growth characteristics that were atypical for cultured normal human keratinocytes. Cultivated BC-1-Ep cells exhibited stratification as well as features of programmed cell death. To determine replicative lifespan, the BC-1-Ep cells were serially cultivated to senescence in standard keratinocyte growth medium at a density of $3 \times 10^5$ cells per 100-mm dish and passaged at weekly intervals (approximately a 1:25 split). By passage 15, most keratinocytes in the population appeared senescent as judged by the presence of numerous abortive colonies which exhibited large, flat cells. However, at passage 16, keratinocytes exhibiting a small cell size were evident. By passage 17, only the small-sized keratinocytes were present in the culture and no large, senescent keratinocytes were evident. The resulting population of small keratinocytes that survived this putative crisis period appeared morphologically uniform and produced colonies of keratinocytes exhibiting typical keratinocyte characteristics including cell-cell adhesion and apparent squame production. The keratinocytes that survived senescence were serially cultivated at a density of $3 \times 10^5$ cells per 100-mm dish. Typically the cultures reached a cell density of approximately $8 \times 10^6$ cells within 7 days. This stable rate of cell growth was maintained through at least 59 passages, demonstrating that the cells had achieved immortality. The keratinocytes that emerged from the original senescencing population were originally designated BC-1-Ep/Spontaneous Line and are now termed NIKS®. The NIKS® cell line has been screened for the presence of proviral DNA sequences for HIV-1, HIV-2, EBV, CMV, HTLV-1, HTLV-2, HBV, HCV, B-19 parvovirus, HPV-16 and HPV-31 using either PCR or Southern analysis. None of these viruses were detected.

Chromosomal analysis was performed on the parental BC-1-Ep cells at passage 3 and NIKS cells at passages 31 and 54. The parental BC-1-Ep cells have a normal chromosomal complement of 46, XY. At passage 31, all NIKS® cells contained 47 chromosomes with an extra isochromosome of the long arm of chromosome 8. No other gross chromosomal abnormalities or marker chromosomes were detected. At passage 54, all cells contained the isochromosome 8.

The DNA fingerprints for the NIKS® cell line and the BC-1-Ep keratinocytes are identical at all twelve loci analyzed demonstrating that the NIKS® cells arose from the parental BC-1-Ep population. The odds of the NIKS® cell line having the parental BC-1-Ep DNA fingerprint by random chance is $4 \times 10^{-16}$. The DNA fingerprints from three different sources of human keratinocytes, ED-1-Ep, SCC4 and SCC13y are different from the BC-1-Ep pattern. This data also shows that keratinocytes isolated from other humans, ED-1-Ep, SCC4, and SCC13y, are unrelated to the BC-1-Ep cells or each other. The NIKS® DNA fingerprint data provides an unequivocal way to identify the NIKS® cell line.

Loss of p53 function is associated with an enhanced proliferative potential and increased frequency of immortality in cultured cells. The sequence of p53 in the NIKS® cells is identical to published p53 sequences (GenBank accession number: M14695). In humans, p53 exists in two predominant polymorphic forms distinguished by the amino acid at codon 72. Both alleles of p53 in the NIKS® cells are wild-type and have the sequence CGC at codon 72, which codes for an arginine. The other common form of p53 has a proline at this position. The entire sequence of p53 in the NIKS® cells is identical to the BC-1-Ep progenitor cells. Rb was also found to be wild-type in NIKS® cells.

Anchorage-independent growth is highly correlated to tumorigenicity in vivo. For this reason, the anchorage-independent growth characteristics of NIKS® cells in agar or methylcellulose-containing medium was investigated. After 4 weeks in either agar- or methylcellulose-containing medium, NIKS® cells remained as single cells. The assays were continued for a total of 8 weeks to detect slow growing variants of the NIKS® cells. None were observed.

To determine the tumorigenicity of the parental BC-1-Ep keratinocytes and the immortal NIKS® keratinocyte cell line, cells were injected into the flanks of athymic nude mice. The human squamous cell carcinoma cell line, SCC4, was used as a positive control for tumor production in these animals. The injection of samples was designed such that animals received SCC4 cells in one flank and either the parental BC-1-Ep keratinocytes or the NIKS® cells in the opposite flank. This injection strategy eliminated animal to animal variation in tumor production and confirmed that the mice would support vigorous growth of tumorigenic cells. Neither the parental BC-1-Ep keratinocytes (passage 6) nor the NIKS® keratinocytes (passage 35) produced tumors in athymic nude mice.

NIKS® cells were analyzed for the ability to undergo differentiation in both surface culture and organotypic culture. Techniques for organotypic culture are described in detail in the examples. In particularly preferred embodiments, the organotypically cultured skin equivalents of the present invention comprise a dermal equivalent formed from collagen or a similar material and fibroblasts. The keratinocytes, for example NIKS® cells or a combination of NIKS® cells and cell from a patient are seeded onto the dermal equivalent and form an epidermal layer characterized by squamous differentiation following the organotypic culture process.

For cells in surface culture, a marker of squamous differentiation, the formation cornified envelopes was monitored. In cultured human keratinocytes, early stages of cornified envelope assembly result in the formation of an immature structure composed of involucrin, cystatin-α and other proteins, which represent the innermost third of the mature cornified envelope. Less than 2% of the keratinocytes from the adherent BC-1-Ep cells or the NIKS® cell line produce cornified envelopes. This finding is consistent with previous studies demonstrating that actively growing, subconfluent keratinocytes produce less than 5% cornified envelopes. To determine whether the NIKS® cell line is capable of producing cornified envelopes when induced to differentiate, the cells were removed from surface culture and suspended for 24 hours in medium made semi-solid with methylcellulose. Many aspects of terminal differentiation, including differential expression of keratins and cornified envelope formation can be triggered in vitro by loss of keratinocyte cell-cell and cell-substratum adhesion. The NIKS® keratinocytes produced as many as and usually more cornified envelopes than the parental keratinocytes. These findings demonstrate that the NIKS® keratinocytes are not defective in their ability to initiate the formation of this cell type-specific differentiation structure.

To confirm that the NIKS® keratinocytes can undergo squamous differentiation, the cells were cultivated in organotypic culture. Keratinocyte cultures grown on plastic substrata and submerged in medium replicate but exhibit limited differentiation. Specifically, human keratinocytes become confluent and undergo limited stratification producing a sheet consisting of 3 or more layers of keratinocytes. By light and electron microscopy there are striking differences between the architecture of the multilayered sheets formed in tissue culture and intact human skin. In contrast, organotypic culturing techniques allow for keratinocyte growth and differentiation under in vivo-like conditions. Specifically, the cells adhere to a physiological substratum consisting of dermal fibroblasts embedded within a fibrillar collagen base. The organotypic culture is maintained at the air-medium interface. In this way, cells in the upper sheets are air-exposed while the proliferating basal cells remain closest to the gradient of nutrients provided by diffusion through the collagen gel. Under these conditions, correct tissue architecture is formed. Several characteristics of a normal differentiating epidermis are evident. In both the parental cells and the NIKS® cell line a single layer of cuboidal basal cells rests at the junction of the epidermis and the dermal equivalent. The rounded morphology and high nuclear to cytoplasmic ratio is indicative of an actively dividing population of keratinocytes. In normal human epidermis, as the basal cells divide they give rise to daughter cells that migrate upwards into the differentiating layers of the tissue. The daughter cells increase in size and become flattened and squamous. Eventually these cells enucleate and form cornified, keratinized structures. This normal differentiation process is evident in the upper layers of both the parental cells and the NIKS® cells. The appearance of flattened squamous cells is evident in the upper layers of keratinocytes and demonstrates that stratification has occurred in the organotypic cultures. In the uppermost part of the organotypic cultures the enucleated squames peel off the top of the culture. To date, no histological differences in differentiation at the light microscope level between the parental keratinocytes and the NIKS® keratinocyte cell line grown in organotypic culture have been observed To observe more detailed characteristics of the parental (passage 5) and NIKS® (passage 38) organotypic cultures and to confirm the histological observations, samples were analyzed using electron microscopy. Parental cells and the immortalized human keratinocyte cell line, NIKS® were harvested after 15 days in organotypic culture and sectioned perpendicular to the basal layer to show the extent of stratification. Both the parental cells and the NIKS® cell line undergo extensive stratification in organotypic culture and form structures that are characteristic of normal human epidermis. Abundant desmosomes are formed in organotypic cultures of parental cells and the NIKS® cell line. The formation of a basal lamina and associated hemidesmosomes in the basal keratinocyte layers of both the parental cells and the cell line was also noted.

Hemidesmosomes are specialized structures that increase adhesion of the keratinocytes to the basal lamina and help maintain the integrity and strength of the tissue. The presence of these structures was especially evident in areas where the parental cells or the NIKS® cells had attached directly to the porous support. These findings are consistent with earlier ultrastructural findings using human foreskin keratinocytes cultured on a fibroblast-containing porous support. Analysis at both the light and electron microscopic levels demonstrate that the NIKS® cell line in organotypic culture can stratify, differentiate, and form structures such as desmosomes, basal lamina, and hemidesmosomes found in normal human epidermis.

B) Shipping, Storage, and Use at Site

In some preferred embodiments, the present invention provides method, kits and devices for shipping and storing an organotypically cultured skin equivalent to a user for use in a skin grafting procedure. The present invention is not limited to any particular method of producing organotypically cultured human skin equivalents. Indeed, a variety of methods may be used. In preferred embodiments, the organotypically cultured skin equivalents of the present invention are produced by the methods described above and in the examples, or modifications thereof.

Previous shipping and storage systems have relied on the use of complex media and the need to revive the skin equivalent under optimal culture conditions prior to use. For example, EpiDerm™ skin equivalents, which lack a dermal equivalent, are shipped at 2-8 C on a gelled media comprising EGF, insulin, hydrocortisone and other proprietary factors. Once the skin equivalents arrive at the site of use, it has been reported that further storage requires immersing the skin equivalents with an optimal liquid media such as HypoThermasol™ and culture at 37 C to revive the skin equivalents prior to use. See e.g., Cook et al., Tissue Engineering 1(4):361-77 (1995). Other studies demonstrate that storage at room temperature is optimal. Robb et al., J. Burn Care Rehab. 22(6):393-396 (2001). Such systems require unpackaging and culture of the skin equivalents or cadaveric grafts in liquid media prior to use, which is not practical for clinical use where the sterility of the packaged tissue must be maintained.

In some embodiments of the present invention, the organotypically cultured skin equivalents are aseptically packaged at the site of manufacture for shipment to a site of use. The date this occurs on is. the "packaging date." In preferred embodiments, the organotypically cultured skin equivalents are sealed in a sterile package under sterile conditions. In preferred embodiments, the organotypically cultured skin equivalents are placed in contact with a gel support. The present invention is not limited to any particular gel support. In some preferred embodiments, the gel support is agarose. In preferred embodiments, the gel support is produced with or comprises a minimal media. Surprisingly, the present inventors have found that organotypically cultured skin equivalents can be supported for extended periods of time on gel supports supplemented with minimal media as opposed to complex media comprising active biological agents such as growth factors (e.g., epidermal growth factor, insulin and insulin-like growth factor 1) and steroids (e.g., hydrocortisone). Minimal media are media that are substantially free of biologically active growth factors and hormones. By substantially free it is meant, for example, the media comprises less than about 1 mg/ml, 0.5 mg/ml, 100 ug/ml, 50 ug/ml, 10 ug/ml, 1 ug/ml, 500 ng/ml, 100 ng/ml, 10 ng/ml, 1 ng/ml or 0.1 ng/ml of a growth factor (e.g., EGF, IGF-1, or insulin) or steroid (e.g., hydrocortisone). In some preferred embodiments, the minimal media is a mixture of DMEM and F12 and is serum free.

In some preferred embodiments, the gel support is formed or placed in a shipping chamber. A shipping chamber of the present invention is illustrated in FIG. 1. Referring to FIG. 1, the shipping chamber 100 is preferably constructed from a p150 tissue culture dish with a diameter of approximately 150 mm and height of approximately 20 mm. The shipping chamber preferably comprises a chamber top 110 and a chamber bottom 115. The chamber bottom 115 preferably comprises a chamber side wall 120 and a chamber bottom surface 125. In preferred embodiments, a gel support 130 is formed on the chamber bottom surface. In some preferred embodiments, the shipping chamber comprises an insert 135 comprising a permeable membrane 140 and insert extensions 142. In preferred embodiments, the skin equivalent 145 is formed on the permeable membrane 140. In some preferred embodiments, the permeable membrane 140 of the insert 135 is placed in contact with the gel support 130. In some preferred embodiments, the height of the gel support 130 within the shipping chamber 100 is such that when the insert 135 is placed in the shipping chamber 100 on gel support 130, the insert extensions 142 extend upward and contact the chamber top 110 when chamber top 110 is placed on chamber bottom 115 so that the insert 135 is secured on the gel support 130 by the downward force exerted by the chamber top 110 and the insert extensions 142.

In some preferred embodiments, the temperature of the sterile package is reduced to about 2-8 degrees C. Surprisingly, the present inventors have found that organotypically cultured skin equivalents can be shipped and stored at lowered temperatures and maintain their viability for use in skin grafting and wound closing procedures. The ability to ship and store at lowered temperatures greatly increases the flexibility of manufacturing, shipping and using organotypically cultured skin equivalents. This stands in direct contrast to the manufacturing, shipping, and use of other organotypically cultured skin equivalents such as APLIGRAF® which is usable for less than ten days and must be maintained between 20 and 23° C. until used. Using the methods and devices of the present invention, organotypically cultured skin equivalents can be preferably used up to 15 days after the packaging date. The additional storage time greatly enhances the flexibility of use of the organotypically cultured skin equivalents.

In preferred embodiments, the sterile package is placed in an insulated container and packed with cold packs, preferably gel cold packs, to maintain the temperature of the sterile package at 2-8 degrees C. during shipping. Upon arrival at the site of use, such as at a hospital, emergency care clinic, military medical unit or other health care clinic, the sterile package is removed from the insulated container and placed in a refrigeration unit for storage at 2-8 C. until the time of use. In some preferred embodiments, the integrity (and sterility) of the sterile package is maintained until immediately prior to use by a physician or other care giver, for example, in an operating room. In preferred embodiments, an intervening culture step or revival period is not required prior to use of the organotypically cultured skin equivalent in a skin grafting or wound closure procedure. This feature represents a substantial, unexpected improvement over prior methods where the tissue either must be stored at a higher temperature or revived at a higher temperature in a liquid media for use.

C) Therapeutic Uses

It is contemplated that the preserved cells, organs, and tissues of the present invention may be used therapeutically.

In some embodiments, the cells, organs, and tissues are utilized to treat chronic skin wounds. Successful treatment of chronic skin wounds (e.g., venous ulcers, diabetic ulcers, pressure ulcers) is a serious problem. The healing of such a wound often times takes well over a year of treatment. Treatment options currently include dressings and debridement (use of chemicals or surgery to clear away necrotic tissue), and/or antibiotics in the case of infection. These treatment options take extended periods of time and high amounts of patient compliance. As such, a therapy that can increase a practitioner's success in healing chronic wounds and accelerate the rate of wound healing would meet an unmet need in the field. Accordingly, the present invention contemplates treatment of skin wounds with skin equivalents comprising the cells of the present invention (e.g., NIKS® cells). In some embodiments, NIKS® cells are topically applied to wound sites. In other embodiments, skin equivalents comprising NIKS® cells are used for engraftment on partial thickness wounds. In other embodiments, skin equivalents comprising NIKS® cells are used for engraftment on full thickness wounds. In other embodiments, skin equivalents comprising NIKS® cells are used to treat numerous types of internal wounds, including, but not limited to, internal wounds of the mucous membranes that line the gastrointestinal tract, ulcerative colitis, and inflammation of mucous membranes that may be caused by cancer therapies. In still other embodiments, skin equivalents comprising NIKS® cells expressing are used as a temporary or permanent wound dressing.

Skin equivalents comprising cells also find use in wound closure and burn treatment applications. The use of autografts and allografts for the treatment of burns and wound closure is described in Myers et al., A. J. Surg. 170(1):75-83 (1995) and U.S. Pat. Nos. 5,693,332; 5,658,331; and 6,039,760, each of which is incorporated herein by reference. In some embodiments, the skin equivalents may be used in conjunction with dermal replacements such as DERMAGRAFT or INTEGRA. In other embodiments, the skin equivalents are produced using both a standard source of keratinocytes (e.g., NIKS® cells) and keratinocytes from the patient that will receive the graft. Therefore, the skin equivalent contains keratinocytes from two different sources. In still further embodiments, the skin equivalent contains keratinocytes from a human tissue isolate. Accordingly, the present invention provides methods for wound closure, including wounds caused by burns, comprising providing a skin equivalent and a patient suffering from a wound and treating the patient with the skin equivalent under conditions such that the wound is closed.

In still further embodiments, the cells are engineered to provide additional therapeutic agents to a subject. The present invention is not limited to the delivery of any particular therapeutic agent. Indeed, it is contemplated that a variety of therapeutic agents may be delivered to the subject, including, but not limited to, enzymes, peptides, peptide hormones, other proteins, ribosomal RNA, ribozymes, and antisense RNA. These therapeutic agents may be delivered for a variety of purposes, including but not limited to the purpose of correcting genetic defects. In some particular preferred embodiments, the therapeutic agent is delivered for the purpose of detoxifying a patient with an inherited inborn error of metabolism (e.g., aminoacidopathesis) in which the graft serves as wild-type tissue. It is contemplated that delivery of the therapeutic agent corrects the defect. In some embodiments, the cells are transformed with a DNA construct encoding a therapeutic agent (e.g., insulin, clotting factor IX, erythropoietin, etc) and the cells grafted onto the subject. The therapeutic agent is then delivered to the patient's bloodstream or other tissues from the graft. In preferred embodiments, the nucleic acid encoding the therapeutic agent is operably linked to a suitable promoter. The present invention is not limited to the use of any particular promoter. Indeed, the use of a variety of promoters is contemplated, including, but not limited to, inducible, constitutive, tissue specific, and keratinocyte specific promoters. In some embodiments, the nucleic acid encoding the therapeutic agent is introduced directly into the keratinocytes (i.e., by calcium phosphate co-precipitation or via liposome transfection). In other preferred embodiments, the nucleic acid encoding the therapeutic agent is provided as a vector and the vector is introduced into the keratinocytes by methods known in the art. In some embodiments, the vector is an episomal vector such as a plasmid. In other embodiments, the vector integrates into the genome of the keratinocytes. Examples of integrating vectors include, but are not limited to, retroviral vectors, adeno-associated virus vectors, and transposon vectors.

EXPERIMENTAL

The following examples are provided in order to demonstrate and further illustrate certain preferred embodiments and aspects of the present invention and are not to be construed as limiting the scope thereof.

In the experimental disclosure which follows, the following abbreviations apply: eq (equivalents); M (Molar); mM (millimolar); µM (micromolar); N (Normal); mol (moles); mmol (millimoles); µmol (micromoles); nmol (nanomoles); g (grams); mg (milligrams); µg (micrograms); ng (nanograms); l or L (liters); ml (milliliters); µl (microliters); cm (centimeters); mm (millimeters); µm (micrometers); nm (nanometers); C (degrees Centigrade); U (units), mU (milliunits); min. (minutes); sec. (seconds); % (percent); kb (kilobase); bp (base pair); PCR (polymerase chain reaction); BSA (bovine serum albumin).

Example 1

This example describes a method for the production of skin equivalents.

Media.

The organotypic culture process uses six different culture media: 3T3 feeder cell medium (TM); human fibroblast growth medium (FGM); NIKS® medium (NM); plating medium (PM); stratification medium A (SMA); and stratification medium B (SMB). TM is used to propagate 3T3 cells that act as feeder cells for NIKS® cells in monolayer culture. TM is a mixture of Dulbecco's modified Eagle's medium (DME, GibcoBRL) supplemented with 10% calf serum (Hyclone). FGM is a commercially available fibroblast growth medium (Clonetics) that is used to propagate the normal human dermal fibroblast cells (NHDFs) for use in STRATAGRAFT® skin equivalent and STATATEST skin equivalent dermal equivalent layers. NM is used to grow NIKS® keratinocytes. NM is a 3:1 mixture of Ham's F-12 medium (GibcoBRL) and DME supplemented with 2.5% fetal clone II (Hyclone), 0.4 µg/ml hydrocortisone (Calbiochem), 8.4 ng/ml cholera toxin (ICN), 5 µg/ml insulin (Sigma), 24 µg/ml adenine (Sigma) and 10 ng/ml epidermal growth factor (EGF, R&D systems). PM is the medium used when NIKS® cells are seeded onto a dermal equivalent. PM is the same NM with the exception that EGF is removed, the serum is reduced to 0.2%, and $CaCl_2$ (Sigma) is supplemented to a final calcium concentration of 1.88 nm. SMA is the same as PM with the addition of 1 mg/ml bovine serum albumin (BSA), 1 µM isoproterenol, 10 µM carnitine, 10 µM serine, 25 µM oleic acid, 15 µM linoleic acid, 7 µM arachidonic acid, 1 µM α-tocopherol, 0.05 mg/ml ascorbic acid (all from Sigma), and 1 ng/ml EGF. SMB is used during the epidermal stratification phase of STRATATEST skin equivalent and STRATAGRAFT® skin equivalent growth. SMB is the same as SMA but without the presence of the fetal clone II serum supplement.

Feeder Preparation.

Prior to starting STRATAGRAFT® skin equivalent organotypic cultures, 3T3 feeder cells are prepared and then used either fresh or frozen for later use. 3T3 cells are grown to confluence and treated with mitomycin-C (4 ug/ml in TM, Roche) for four hours. The cells are then washed, resuspended, and plated at a density of $1.25 \times 10^6$ per 100 mm tissue culture dish to support NIKS® growth. If frozen feeders are used, a single frozen ampoule containing 1 ml with $2 \times 10^6$ is thawed, diluted with fresh TM and plated onto two 100 mm tissue culture dishes. This is done for as many dishes as will be needed for NIKS® cell growth one prior to plating the NIKS® cells.

Dermal Equivalent Preparation.

On day 0, frozen NHDF cells are thawed and plated. The cells are fed FGM-2 the next day (day 1) to residual cryoprotectant and again on day 3. On day 4, they are harvested for in the dermal equivalent. To prepare the dermal equivalent, rat-tail collagen (Type I, Becton-Dickinson) is first diluted to 3 mg/ml in 0.03N acetic acid and chilled on ice. A mixture of concentrated Ham's F12 medium (8.7× normal strength and buffered with HEPES at pH 7.5) is mixed with fetal clone II (supplemented bovine serum). These two solutions are 11.5 and 10% of the final solution volume. 1N NaOH is added to the medium mixture (2.5% of final solution). The diluted collagen is then added (74%) to the mixture. A 2% volume of suspended fibroblasts ($1.3 \times 10^6$ for STRATAGRAFT® skin equivalent) is added to the mixture. For STRATATEST cultures, 100 µl is aliquoted into tissue culture inserts (MILLICELL from Millipore Corp.) and placed in a 100 mm tissue culture dish. After 30 minutes for gel formation, the dish is flooded with 20 ml of FGM-2. One or two drops of the F-12-serum mix are placed on the surface of each dermal equivalent. STRATAGRAFT® skin equivalent uses TRANSWELL inserts from Corning. A 13 ml dermal equivalent is poured into each insert. After the 30 minute gel formation period, 80 ml of FGM-2 is placed around the TRANSWELL insert in a 150 mm tissue culture dish and 10 ml is placed on top of the dermal equivalent. The inserts are placed in 37° C., 5% $CO_2$, 90% relative humidity incubator until used. At the time the dermal equivalents are seeded with NIKS® cells, they are lifted to the air interface by placing them onto a sterile stainless steel mesh to supply medium through the bottom of the tissue culture insert.

NIKS® Growth and Seeding.

On day 0, the feeders are plated in NM. On day 1, NIKS® cells are plated onto the feeders at a density of approximately $3 \times 10^5$ cells per 100 mm dish. On day 2, the NIKS® cells are fed fresh NM to remove residual cryoprotectant. The NIKS® cells are fed again on days 4 and 6. (For STRATAGRAFT® skin equivalent size cultures, the NIKS® cultures are started a week earlier due to the increase in number of cells needed). On day 8, the NIKS® cells are harvested, counted, and resuspended in PM. $4.65 \times 10^5$ NIKS® cells/cm² are seeded onto the surface of the MIILLICELL or TRANSWELL inserts. The dishes are fed 30 ml PM (100 ml for STRATAGRAFT® skin equivalent) underneath the metal lifter and placed back into the incubator. On day 10, the cultures are fed SMA. On days 12, 14, 16, 18, 20, and 22 the cultures are fed SMB. On day 12, the cultures are transferred to a 75% humidity incubator where they remain for the rest of their growth.

Example 2

This example demonstrates that storage of skin equivalents for 1 day at 2-8 C is superior to storage at 20-25 C.

Summary:

STRATAGRAFT® skin tissue is a living skin substitute tissue that has a fully-stratified layer of viable epidermal keratinocytes on a collagen gel containing normal human dermal fibroblasts. The uppermost epidermal layers form a permeability barrier that prevents excessive moisture loss through the epidermis. Assays that measure these key structural and functional properties (viability, histology, and barrier function) have been identified as stability-indicating assays for monitoring the quality of STRATAGRAFT® skin tissue over time.

The production process for STRATAGRAFT® skin tissue lasts 31 days. At the end of the production process, STRATAGRAFT® skin tissues are removed from organotypic culturing conditions and placed onto HEPES-buffered nutrient-agarose shipping chambers, which are designed to maintain the viability, barrier function, and histological architecture of STRATAGRAFT® skin tissues prior to clinical use. This study was conducted to compare STRATAGRAFT® skin tissue properties following storage on shipping chambers for 1 day at 2°-8° C. or 20°-25° C. Two independent lots of STRATAGRAFT® skin tissue were analyzed for viability, barrier function, and histology after a 1 day storage period at 2°-8° C. or 20°-25° C. Tissues stored at both temperatures had comparable barrier function, and histology. However, storage at 2°-8° C. resulted in tissue with higher viability than tissues stored at 20°-25° C. This study demonstrated that storage of STRATAGRAFT® skin tissue at 2°-8° C. for 1 day resulted in tissue properties that were similar to, or superior to, those of tissues stored at 20°-25° C.

Experimental Design:

Two independent STRATAGRAFT® lots produced under cGMP at the Waisman Clinical Biomanufacturing Facility (WCBF) were used for this study. One tissue from each lot was tested on day 28 of the STRATAGRAFT® production process by Stratatech Quality Control according to the SOPs for viability, barrier function, and histology. The six remaining tissues in each lot were fed on process day 28 and process day 30. On process day 31, the 6 tissues were placed onto shipping chambers and stored in triplicate at 2°-8° C. or 20°-25° C. for 1 day. To allow for standardization of the tissue analysis conditions, the tissues that were stored at 2°-8° C. were warmed for 1 hour at 20°-25° C. prior to analysis.

Figure 2:
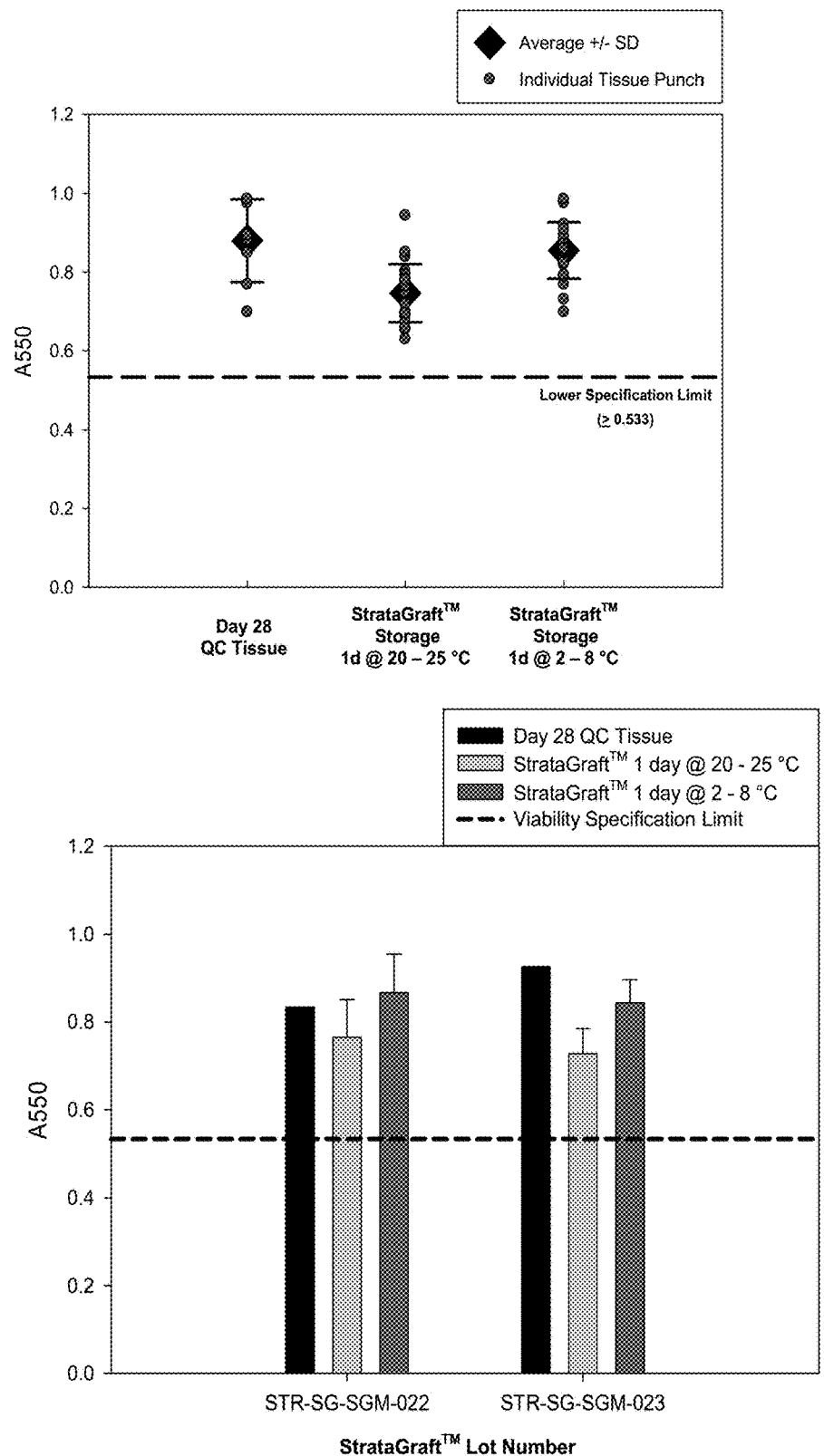
FIG. 2 is a viability data graft.

Results:

Viability:

Data are presented below in Tables 1 and 2 and in FIG. 2. All samples from STRATAGRAFT® skin tissues stored for 1 day at 20°-25° C. and 2°-8° C. met the viability acceptance criteria (A550¬≥0.533). The viability of tissues stored at 2°-8° C. was comparable to the Day 28 QC tissues and was higher than that of tissues stored at 20°-25° C.

TABLE 1

Viability Summary

|  | Day 28 QC Tissue | StrataGraft ™ Skin Tissue Storage 1 d @ 20-25° C. | StrataGraft ™ Skin Tissue Storage 1 d @ 2-8° C. |
|---|---|---|---|
| Sample size | 8 | 24 | 24 |
| Mean | 0.880 | 0.746 | 0.855 |
| Minimum | 0.699 | 0.630 | 0.699 |
| Maximum | 0.986 | 0.944 | 0.986 |
| Count <0.533 | 0 | 0 | 0 |
| SD | 0.104 | 0.074 | 0.072 |
| % Viability of Day 28 | 100 | 85 | 97 |

TABLE 2

Viability Individual Values

| Tissue | Location | A550 |
|---|---|---|
| Day 28 QC Tissue | | |
| Lot 022 Tissue 6 | Center | 0.699 |
|  | Edge | 0.985 |
|  | Edge | 0.769 |
|  | Edge | 0.882 |
| Lot 023 Tissue 7 | Center | 0.976 |
|  | Edge | 0.849 |
|  | Edge | 0.894 |
|  | Edge | 0.986 |
| StrataGraft ™ Skin Tissue Storage 1 d @ 20-25° C. | | |
| Lot 022 Tissue 1 | Center | 0.654 |
|  | Edge | 0.803 |
|  | Edge | 0.656 |
|  | Edge | 0.687 |
| Lot 022 Tissue 2 | Center | 0.765 |
|  | Edge | 0.944 |
|  | Edge | 0.699 |
|  | Edge | 0.778 |
| Lot 022 Tissue 3 | Center | 0.756 |
|  | Edge | 0.750 |
|  | Edge | 0.839 |
|  | Edge | 0.851 |
| Lot 023 Tissue 4 | Center | 0.690 |
|  | Edge | 0.794 |
|  | Edge | 0.673 |
|  | Edge | 0.719 |
| Lot 023 Tissue 5 | Center | 0.630 |
|  | Edge | 0.767 |
|  | Edge | 0.782 |
|  | Edge | 0.764 |
| Lot 023 Tissue 6 | Center | 0.695 |
|  | Edge | 0.782 |
|  | Edge | 0.657 |
|  | Edge | 0.780 |
| StrataGraft ™ Skin Tissue Storage 1 d @ 2-8° C. | | |
| Lot 022 Tissue 4 | Center | 0.699 |
|  | Edge | 0.985 |
|  | Edge | 0.769 |
|  | Edge | 0.882 |
| Lot 022 Tissue 5 | Center | 0.976 |
|  | Edge | 0.849 |
|  | Edge | 0.894 |
|  | Edge | 0.986 |
| Lot 022 Tissue 7 | Center | 0.832 |
|  | Edge | 0.820 |
|  | Edge | 0.890 |
|  | Edge | 0.821 |
| Lot 023 Tissue 1 | Center | 0.789 |
|  | Edge | 0.852 |
|  | Edge | 0.854 |
|  | Edge | 0.859 |
| Lot 023 Tissue 2 | Center | 0.794 |
|  | Edge | 0.731 |
|  | Edge | 0.871 |
|  | Edge | 0.858 |

TABLE 2-continued

Viability Individual Values

| Tissue | Location | A550 |
|---|---|---|
| Lot 023 | Center | 0.823 |
| Tissue 3 | Edge | 0.922 |
|  | Edge | 0.860 |
|  | Edge | 0.909 |

Barrier Function:

Barrier function data are presented below in Tables 3 and 4. The acceptance criteria for barrier function are all readings must have an initial DPM value ≤294 and a DPM change over a 10 second interval ≤658.

The Day 28 QC tissues and the STRATAGRAFT® skin tissues stored at 20°-25° C. had acceptable barrier function. A single reading from one STRATAGRAFT® skin tissue stored at 2°-8° C. had an initial DPM value above the acceptance criteria (bolded in Table 4). This failing read was noted to have occurred on an area of the tissue where liquid had pooled. Therefore, the pooled liquid on the surface of the tissue is likely the cause of the high initial value. All other readings from STRATAGRAFT® skin tissues stored at 2°-8° C. passed the acceptance criteria and were comparable to barrier function readings from tissues stored at 20°-25° C. The barrier function improved slightly following storage at either temperature compared to the Day 28 QC tissues. This data demonstrated that the barrier function of STRATAGRAFT® skin tissues stored for 1 day at 20°-25° C. or 2°-8° C. is comparable.

TABLE 3

Barrier Function Summary Table

| Lot | Initial DPM | DPM Change |
|---|---|---|
| Day 28 QC Tissue | | |
| Lot 022 Tissue 6 | 98 | 122 |
| Lot 023 Tissue 7 | 101 | 87 |
| Two lots (2 tissues) | 99 | 104 |
| StrataGraft ™ Skin Tissue Storage 1 d @ 20-25° C. | | |
| Lot 022 (3 tissues) | 94 | 31 |
| Lot 023 (3 tissues) | 96 | 29 |
| Two lots (6 tissues) | 95 | 30 |
| StrataGraft ™ Skin Tissue Storage 1 d @ 2-8° C. | | |
| Lot 022 Tissue 6 | 134 | 79 |
| Lot 023 Tissue 7 | 96 | 32 |
| Two lots (2 tissues) | 115 | 56 |

TABLE 4

Barrier Function Individual Values

| Tissue | Location | DPM Initial | DPM Change |
|---|---|---|---|
| Day 28 QC Tissue | | | |
| Lot 022 Tissue 6 | Center | 90 | 172 |
|  | Edge | 106 | 106 |
|  | Edge | 104 | 104 |
|  | Edge | 90 | 106 |
| Lot 023 Tissue 7 | Center | 102 | 210 |
|  | Edge | 102 | 70 |
|  | Edge | 108 | 38 |
|  | Edge | 92 | 28 |
| StrataGraft ™ Skin Tissue Storage 1 d @ 20-25° C. | | | |
| Lot 022 Tissue 1 | Center | 100 | 20 |
|  | Edge | 92 | 18 |
|  | Edge | 100 | 44 |
|  | Edge | 96 | 24 |
| Lot 022 Tissue 2 | Center | 92 | 40 |
|  | Edge | 96 | 28 |
|  | Edge | 92 | 24 |
|  | Edge | 96 | 16 |
| Lot 022 Tissue 3 | Center | 90 | 42 |
|  | Edge | 90 | 36 |
|  | Edge | 96 | 32 |
|  | Edge | 92 | 44 |
| Lot 023 Tissue 4 | Center | 98 | 28 |
|  | Edge | 106 | 10 |
|  | Edge | 90 | 24 |
|  | Edge | 102 | 20 |
| Lot 023 Tissue 5 | Center | 94 | 28 |
|  | Edge | 90 | 32 |
|  | Edge | 102 | 32 |
|  | Edge | 90 | 28 |
| Lot 023 Tissue 6 | Center | 102 | 16 |
|  | Edge | 94 | 26 |
|  | Edge | 90 | 68 |
|  | Edge | 98 | 36 |
| StrataGraft ™ Skin Tissue Storage 1 d @ 2-8° C. | | | |
| Lot 022 Tissue 4 | Center | 108 | 80 |
|  | Edge | 496 | 272 |
|  | Edge | 90 | 76 |
|  | Edge | 94 | 64 |
| Lot 022 Tissue 5 | Center | 98 | 70 |
|  | Edge | 110 | 40 |
|  | Edge | 96 | 76 |
|  | Edge | 90 | 40 |
| Lot 022 Tissue 7 | Center | 114 | 30 |
|  | Edge | 108 | 38 |
|  | Edge | 110 | 72 |
|  | Edge | 94 | 92 |
| Lot 023 Tissue 1 | Center | 102 | 32 |
|  | Edge | 90 | 40 |
|  | Edge | 94 | 40 |
|  | Edge | 102 | 34 |
| Lot 023 Tissue 2 | Center | 92 | 28 |
|  | Edge | 90 | 32 |
|  | Edge | 92 | 54 |
|  | Edge | 98 | 24 |
| Lot 023 Tissue 3 | Center | 94 | 32 |
|  | Edge | 96 | 30 |
|  | Edge | 98 | 24 |
|  | Edge | 102 | 14 |

Histology:

The typical appearance of a paraffin embedded STRATAGRAFT® tissue section stained with hematoxylin and eosin includes fibroblasts in the dermal layer, a basal layer of small, nucleated keratinocytes at the junction between the epidermal and dermal layers, multiple layers of differentiating keratinocytes above the basal layer, and a layer of flattened corneocytes. All tissues conformed to the specifications for histology. The STRATAGRAFT® skin tissues stored at 2°-8° C. had tissue architecture comparable to tissues stored at 20°-25° C. and both sets of stored tissues were comparable to the Day 28 QC tissues.

Conclusions:

Storage at 2°-8° C. for 1 day resulted in STRATAGRAFT® skin tissues with higher viability than storage at 20°-25° C. The barrier function and histology of tissues stored for 1 day at 2°-8° C. and 20°-25° C. were comparable. These results demonstrate that 1 day of reduced temperature storage at 2°-8° C. does not adversely affect STRATAGRAFT® skin tissue properties compared to tissues stored at 20°-25° C.

Example 3

This example demonstrates that skin equivalents stored for 8 days at 2-8 C are comparable to, or superior to, tissues stored for only 1 day at 20-25 C. Reduction of the storage temperature has been shown to maintain tissue quality comparable to tissues stored at 20°-25° C. (See Example 2). The ability to store STRATAGRAFT® tissue for eight days at 2-8° C. would increase the number of days STRATAGRAFT® tissue is available for clinical use. This study tested the comparability of tissues stored for one day at 20-25° C. with tissues stored at 2-8° C. for eight days. Tissue viability was improved in the tissues that were stored at 2-8° C., even though these tissues were stored for seven additional days.

Experimental Design:

This study used one batch of tissues manufactured under cGMP at the WCBF and two batches produced at the Stratatech pilot production facility. One tissue from each batch was analyzed on process day 28. The remaining six tissues were fed on day 28 and 30, and placed onto shipping chambers on process day 31. Three tissues from each batch were stored at 20-25° C. for 1 day prior to analysis. The remaining three tissues from each batch were stored at 2-8° C. for 8 days. Prior to analysis, the tissues stored for 8 days at 2-8° C. were equilibrated at 20-25° C. for one hour.

Figure 3:
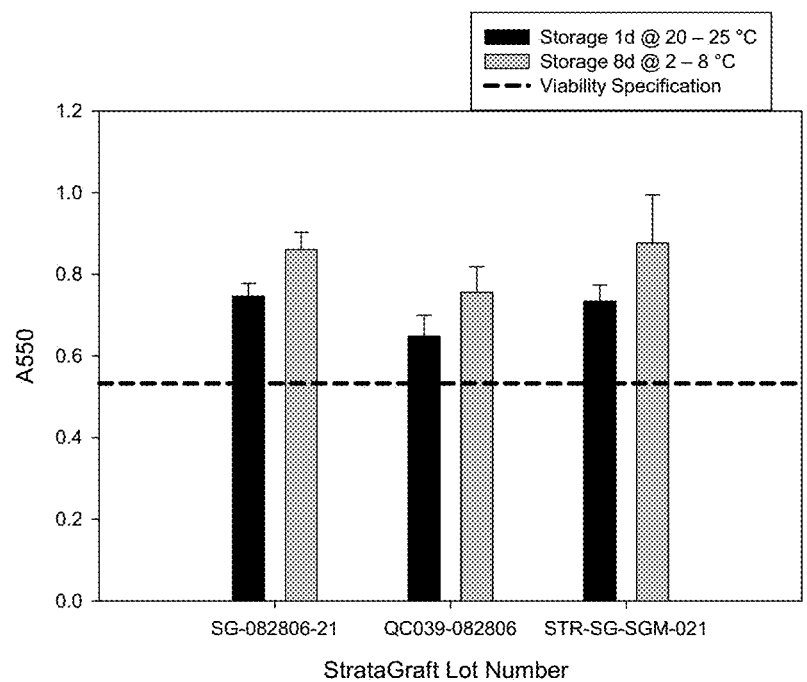
FIG. 3 is a viability data graft.
Figure 3:
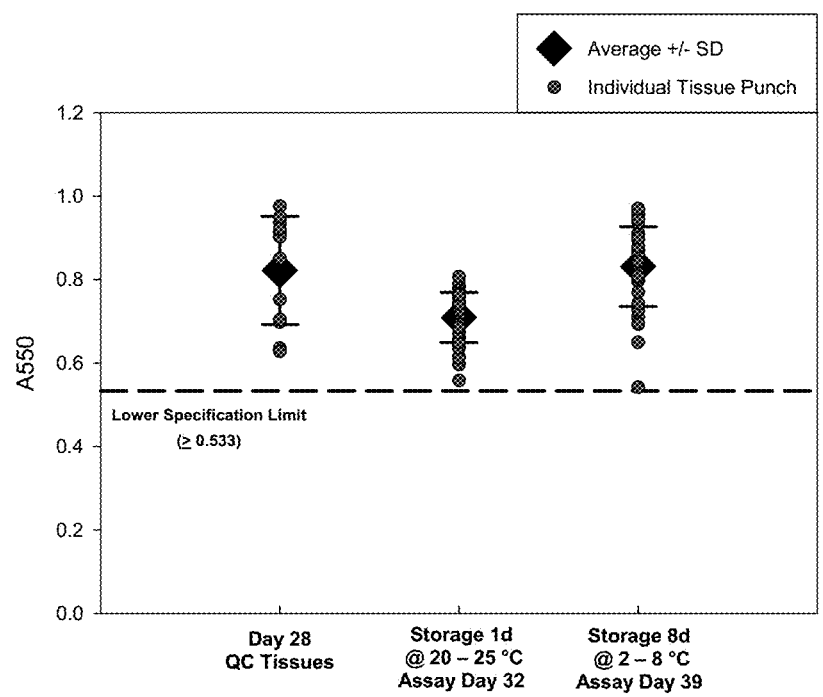

Results:

Tissue Viability:

Viability data is presented in Table 5 and FIG. 3. All viability samples met the acceptance criteria ($A_{550} \geq 0.533$). However, in all three intra-lot comparisons (FIG. 3 left panel), the viability of tissues stored at 2-8° C. for 8 days was higher than tissues stored for one day at 20°-25° C. The mean $A_{550}$ value for the tissues stored at 20°-25° C. for 1 day was 0.709, compared to 0.831 for tissues stored at 2-8° C. for eight days. This data indicates that storage of STRATAGRAFT® tissues at 2-8° C. is better able to maintain tissue viability than storage at 20°-25° C.

TABLE 5

Tissue Viability Data Summary

|  | Day 28 QC Tissue | Storage 1 d @ 20-25° C. | Storage 8 d @ 2-8° C. |
| --- | --- | --- | --- |
| Sample size | 12 | 36 | 36 |
| Mean | 0.822 | 0.709 | 0.831 |
| Minimum | 0.628 | 0.558 | 0.542 |
| Maximum | 0.976 | 0.807 | 0.970 |
| SD | 0.130 | 0.060 | 0.095 |

Barrier Function:

Tissues were analyzed with a Nova impedance meter. Data are presented in Tables 6 and 7. All readings met the lot-release criteria for STRATAGRAFT® tissue (Initial reading ≤294, Change ≤658). This data suggests that storage of STRATAGRAFT® tissue for eight days at 2-8° C. does not adversely affect tissue barrier function, compared to tissues analyzed after storage at 20-25° C. for 1 day.

TABLE 6

Barrier Function Data

| Tissue | Location | DPM Initial | DPM Change |
| --- | --- | --- | --- |
| Day 28 QC Tissue | | | |
| SG-082806-21 | Center | 104 | 520 |
| Day 28 | Edge | 194 | 448 |
|  | Edge | 102 | 428 |
|  | Edge | 108 | 416 |
| QC039-082806 | Center | 120 | 480 |
| Day 28 | Edge | 150 | 438 |
|  | Edge | 90 | 488 |
|  | Edge | 102 | 360 |
| STR-SG-SGM-021 | Center | 96 | 78 |
| Day 28 | Edge | 96 | 112 |
|  | Edge | 96 | 76 |
|  | Edge | 96 | 50 |
| Storage 1 d @ 20-25° C. | | | |
| SG-082806-21 | Center | 106 | 302 |
| Day 32 | Edge | 104 | 298 |
| Tissue 1 | Edge | 106 | 342 |
|  | Edge | 128 | 268 |
| SG-082806-21 | Center | 102 | 332 |
| Day 32 | Edge | 96 | 382 |
| Tissue 2 | Edge | 102 | 334 |
|  | Edge | 138 | 364 |
| SG-082806-21 | Center | 114 | 380 |
| Day 32 | Edge | 114 | 360 |
| Tissue 3 | Edge | 114 | 362 |
|  | Edge | 104 | 374 |
| QC039-082806 | Center | 112 | 232 |
| Day 32 | Edge | 130 | 206 |
| Tissue 1 | Edge | 94 | 298 |
|  | Edge | 114 | 198 |
| QC039-082806 | Center | 108 | 198 |
| Day 32 | Edge | 116 | 230 |
| Tissue 2 | Edge | 90 | 254 |
|  | Edge | 90 | 254 |
| QC039-082806 | Center | 116 | 182 |
| Day 32 | Edge | 130 | 276 |
| Tissue 3 | Edge | 94 | 210 |
|  | Edge | 126 | 160 |
| STR-SG-SGM-021 | Center | 98 | 60 |
| Day 32 | Edge | 114 | 60 |
| Tissue 1 | Edge | 98 | 90 |
|  | Edge | 96 | 70 |
| STR-SG-SGM-021 | Center | 92 | 40 |
| Day 32 | Edge | 98 | 32 |
| Tissue 2 | Edge | 98 | 70 |
|  | Edge | 114 | 38 |
| STR-SG-SGM-021 | Center | 94 | 56 |
| Day 32 | Edge | 94 | 58 |
| Tissue 3 | Edge | 106 | 68 |
|  | Edge | 90 | 106 |
| Storage 8 d @ 2-8° C. | | | |
| SG-082806-21 | Center | 106 | 428 |
| Day 39 | Edge | 132 | 414 |
| Tissue 1 | Edge | 112 | 414 |
|  | Edge | 122 | 422 |
| SG-082806-21 | Center | 114 | 332 |
| Day 39 | Edge | 106 | 442 |
| Tissue 2 | Edge | 96 | 446 |
|  | Edge | 112 | 274 |

TABLE 6-continued

Barrier Function Data

| Tissue | Location | Initial | DPM Change |
|---|---|---|---|
| SG-082806-21 Day 39 Tissue 3 | Center | 112 | 386 |
| | Edge | 110 | 520 |
| | Edge | 112 | 394 |
| | Edge | 122 | 488 |
| QC039-082806 Day 39 Tissue 1 | Center | 100 | 268 |
| | Edge | 114 | 302 |
| | Edge | 106 | 378 |
| | Edge | 106 | 294 |
| QC039-082806 Day 39 Tissue 2 | Center | 116 | 318 |
| | Edge | 94 | 320 |
| | Edge | 110 | 300 |
| | Edge | 128 | 272 |
| QC039-082806 Day 39 Tissue 3 | Center | 96 | 290 |
| | Edge | 112 | 234 |
| | Edge | 118 | 300 |
| | Edge | 122 | 311 |
| STR-SG-SGM-021 Day 39 Tissue 1 | Center | 102 | 112 |
| | Edge | 90 | 122 |
| | Edge | 90 | 48 |
| | Edge | 90 | 40 |
| STR-SG-SGM-021 Day 39 Tissue 2 | Center | 114 | 80 |
| | Edge | 124 | 94 |
| | Edge | 90 | 58 |
| | Edge | 90 | 76 |
| STR-SG-SGM-021 Day 39 Tissue 3 | Center | 114 | 66 |
| | Edge | 90 | 40 |
| | Edge | 94 | 62 |
| | Edge | 90 | 44 |

TABLE 7

Barrier Function Summary Table

| Lot | Initial DPM | DPM Change |
|---|---|---|
| Day 28 Tissues | | |
| SG-082806-21 Day 28 (1 tissue) | 127 | 453 |
| QC039-082806 Day 28 (1 tissue) | 116 | 442 |
| STR-SG-SGM-021 Day 28 (1 tissue) | 96 | 79 |
| Three lots Day 28 (3 tissues) | 113 | 325 |
| Storage 1 d@20-25° C. | | |
| SG-082806-21 Day 32 (3 tissues) | 111 | 342 |
| QC039-082806 Day 32 (3 tissues) | 110 | 225 |
| STR-SG-SGM-021 Day 32 (3 tissues) | 99 | 62 |
| Three lots Day 32 (9 tissues) | 107 | 210 |
| Storage 8 d@2-8° C. | | |
| SG082806-21 Day 39 (3 tissues) | 113 | 413 |
| QC039-082806 Day 39 (3 tissues) | 110 | 299 |
| STR-SG-SGM-021 Day 39 (3 tissues) | 96 | 70 |
| Three Lots Day 39 (9 tissues) | 107 | 261 |

Histology:

The histology of all three sets of tissue stored for 8 days at 2-8° C. met the acceptance criteria for STRATAGRAFT® tissue. In contrast, two of the three STRATAGRAFT® lots stored for one day at 20-25° C. had atypical histology with numerous intercellular gaps. This data suggests that storage of STRATAGRAFT® tissue for eight days at 2-8° C. does not adversely affect tissue histology, compared to tissues stored for 1 day at 20-25° C.

Conclusions:

In this study, STRATAGRAFT® tissue stored for eight days at 2-8° C. had viability, histology and barrier function properties comparable to or better than tissues stored for 1 day at 20-25° C. This result demonstrates that up to eight days of storage at 2-8° C. does not adversely affect STRATAGRAFT® tissue properties.

Example 4

Extending the duration that STRATAGRAFT® skin tissues can be stored on shipping chambers to 15 days is highly desirable as it would enhance the availability of STRATAGRAFT® tissue for clinical use. This example demonstrates that storage of skin equivalents on nutrient-agarose shipping chambers for more than 8 days is sub-optimal at temperatures above 2-8° C.

Experimental Design:

STRATAGRAFT® tissues produced at Stratatech's process development laboratory were packaged onto nutrient-agarose shipping chambers on Day 28 of the production process and stored at approximately 2-8° C., 15° C., or 22.5° C. for 1, 4, 8, 15, or 29 days. Tissues were analyzed for viability and histology after the indicated storage periods. Barrier function measurements were not performed on all tissues, and so this data is not presented.

Figure 4:
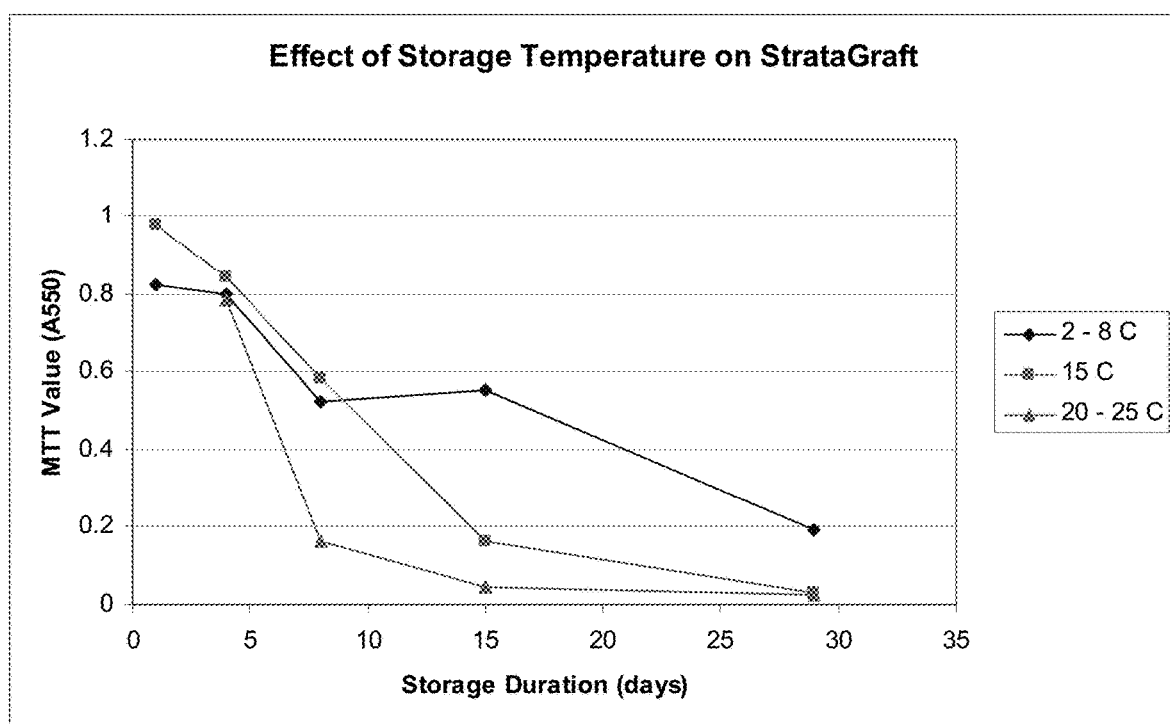
FIG. 4 is a viability data graft.

Results:

The viability data from this study is shown in FIG. 4. All storage temperatures were equivalent in their ability to maintain tissue viability for up to 4 days of storage. After 8 days of storage, viability results from tissues stored at 2-8° C. or 15° C. were comparable to each other and were superior to those of tissues stored at 20-25° C. After 15 or 29 days of storage, tissues stored at 2-8° C. exhibited higher viability compared to tissues stored at 15° C. or 20-25° C.

Conclusions:

This study demonstrates that storage of skin equivalents at 2-8° C. is more robust than storage at temperatures above 15° C. in the ability to support tissue viability beyond 8 days of storage.

Example 5

Extending the duration that STRATAGRAFT® skin tissues can be stored on shipping chambers to 15 days is highly desirable as it would enhance the availability of STRATAGRAFT® tissue for clinical use. This study was conducted to test the feasibility of storing STRATAGRAFT® skin tissue at 2-8° C. for 15 days on shipping chambers containing unsupplemented nutrient agarose.

Experimental Design:

Tissues from three independent STRATAGRAFT® skin tissue lots produced at the WCBF were used for this study. One randomly chosen tissue from each lot was tested on Day 28 of the STRATAGRAFT® skin tissue production process. The six remaining tissues in each lot were fed SMB medium on process Day 28 and process Day 30. On process Day 31, the 6 tissues were placed onto shipping chambers and stored at 2-8° C. for either 1, 8, or 15 days. After the specified storage interval, the tissues were incubated at 20-25° C. for 1 hour and then analyzed for viability, barrier function, and histology.

Results:

Viability:

Viability data is presented in Tables 8 and 9 and in FIG. 4. The acceptance criterion is that all samples have an $A_{550} \geq 0.533$. All Day 28 QC tissues and STRATAGRAFT® skin tissues stored at 2-8° C. for 1, 8, and 15 days in this study met the viability acceptance criteria.

TABLE 8

Viability Summary

|  | Day 28 QC Tissue | StrataGraft ™ Skin Tissue Storage 1 d @ 2-8° C. | StrataGraft ™ Skin Tissue Storage 8 d @ 2-8° C. | StrataGraft ™ Skin Tissue Storage 15 d @ 2-8° C. |
| --- | --- | --- | --- | --- |
| Sample size | 12 | 12 | 24 | 36 |
| Mean (Lot 025) | 0.757 | 0.829 | NA | 0.628 |
| Mean (Lot 027) | 0.963 | NA | 0.734 | 0.686 |
| Mean (Lot 028) | 0.779 | NA | 0.778 | 0.690 |
| Minimum | 0.716 | 0.742 | 0.659 | 0.563 |
| Maximum | 1.019 | 0.901 | 0.865 | 0.851 |
| Count <0.533 | 0 | 0 | 0 | 0 |
| SD (per sample) | 0.110 | 0.051 | 0.057 | 0.061 |
| % of Respective Day 28 QC Tissue | 100% | 108-111% (avg 110%) | 74-103% (avg 88%) | 67-92% (avg 81%) |

TABLE 9

Viability Individual Values

| Tissue | Location | A550 |
| --- | --- | --- |
| Day 28 QC Tissue | | |
| Lot 025 | Center | 0.730 |
| Tissue 1 | Edge | 0.788 |
|  | Edge | 0.739 |
|  | Edge | 0.769 |
| Lot 027 | Center | 0.832 |
| Tissue 4 | Edge | 1.000 |
|  | Edge | 1.019 |
|  | Edge | 1.000 |
| Lot 028 | Center | 0.716 |
| Tissue 6 | Edge | 0.785 |
|  | Edge | 0.818 |
|  | Edge | 0.796 |
| StrataGraft ™ Skin Tissue Storage 1 d @ 2-8° C. | | |
| Lot 025 | Center | 0.749 |
| Tissue 2 | Edge | 0.880 |
|  | Edge | 0.843 |
|  | Edge | 0.901 |

TABLE 9-continued

Viability Individual Values

| Tissue | Location | A550 |
| --- | --- | --- |
| Lot 025 | Center | 0.834 |
| Tissue 3 | Edge | 0.789 |
|  | Edge | 0.835 |
|  | Edge | 0.824 |
| Lot 025 | Center | 0.813 |
| Tissue 4 | Edge | 0.836 |
|  | Edge | 0.901 |
|  | Edge | 0.742 |
| StrataGraft ™ Skin Tissue Storage 8 d @ 2-8° C. | | |
| Lot 027 | Center | 0.751 |
| Tissue 1 | Edge | 0.717 |
|  | Edge | 0.687 |
|  | Edge | 0.700 |
| Lot 027 | Center | 0.723 |
| Tissue 2 | Edge | 0.792 |
|  | Edge | 0.778 |
|  | Edge | 0.757 |
| Lot 027 | Center | 0.741 |
| Tissue 3 | Edge | 0.715 |
|  | Edge | 0.670 |
|  | Edge | 0.781 |
| Lot 028 | Center | 0.734 |
| Tissue 1 | Edge | 0.742 |
|  | Edge | 0.865 |
|  | Edge | 0.856 |
| Lot 028 | Center | 0.769 |
| Tissue 2 | Edge | 0.771 |
|  | Edge | 0.786 |
|  | Edge | 0.838 |
| Lot 028 | Center | 0.758 |
| Tissue 3 | Edge | 0.659 |
|  | Edge | 0.701 |
|  | Edge | 0.856 |
| StrataGraft ™ Skin Tissue Storage 15 d @ 2-8° C. | | |
| Lot 025 | Center | 0.624 |
| Tissue 5 | Edge | 0.563 |
|  | Edge | 0.623 |
|  | Edge | 0.585 |

TABLE 9-continued

Viability Individual Values

| Tissue | Location | A550 |
|---|---|---|
| Lot 025 Tissue 6 | Center | 0.592 |
| | Edge | 0.685 |
| | Edge | 0.648 |
| | Edge | 0.610 |
| Lot 025 Tissue 7 | Center | 0.607 |
| | Edge | 0.636 |
| | Edge | 0.635 |
| | Edge | 0.729 |
| Lot 027 Tissue 5 | Center | 0.622 |
| | Edge | 0.668 |
| | Edge | 0.729 |
| | Edge | 0.712 |
| Lot 027 Tissue 6 | Center | 0.602 |
| | Edge | 0.712 |
| | Edge | 0.734 |
| | Edge | 0.851 |
| Lot 027 Tissue 7 | Center | 0.621 |
| | Edge | 0.712 |
| | Edge | 0.653 |
| | Edge | 0.613 |
| Lot 028 Tissue 4 | Center | 0.660 |
| | Edge | 0.707 |
| | Edge | 0.686 |
| | Edge | 0.702 |
| Lot 028 Tissue 5 | Center | 0.692 |
| | Edge | 0.665 |
| | Edge | 0.571 |
| | Edge | 0.737 |
| Lot 028 Tissue 7 | Center | 0.699 |
| | Edge | 0.738 |
| | Edge | 0.733 |
| | Edge | 0.685 |

Figure 5:
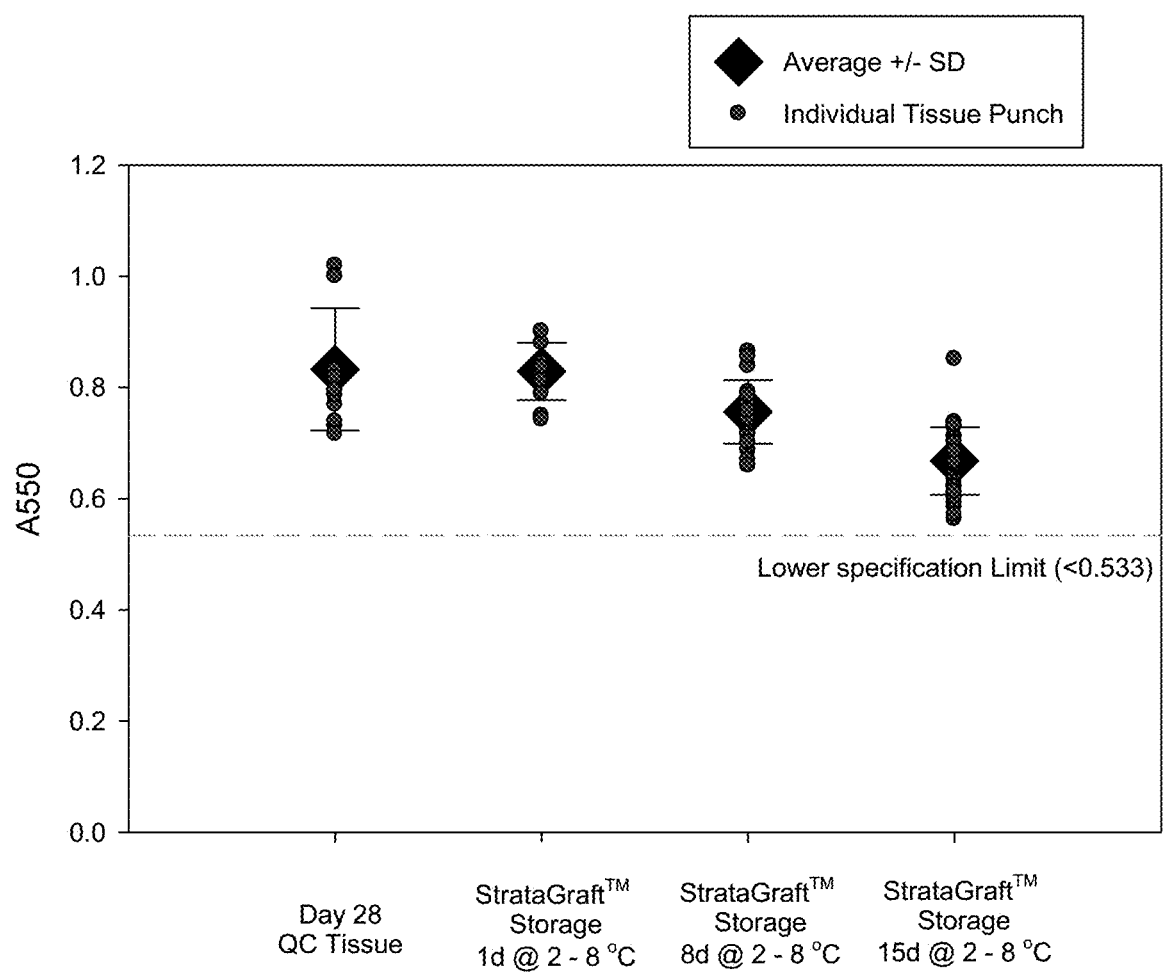
FIG. 5 is a viability data graft.
Figure 6:
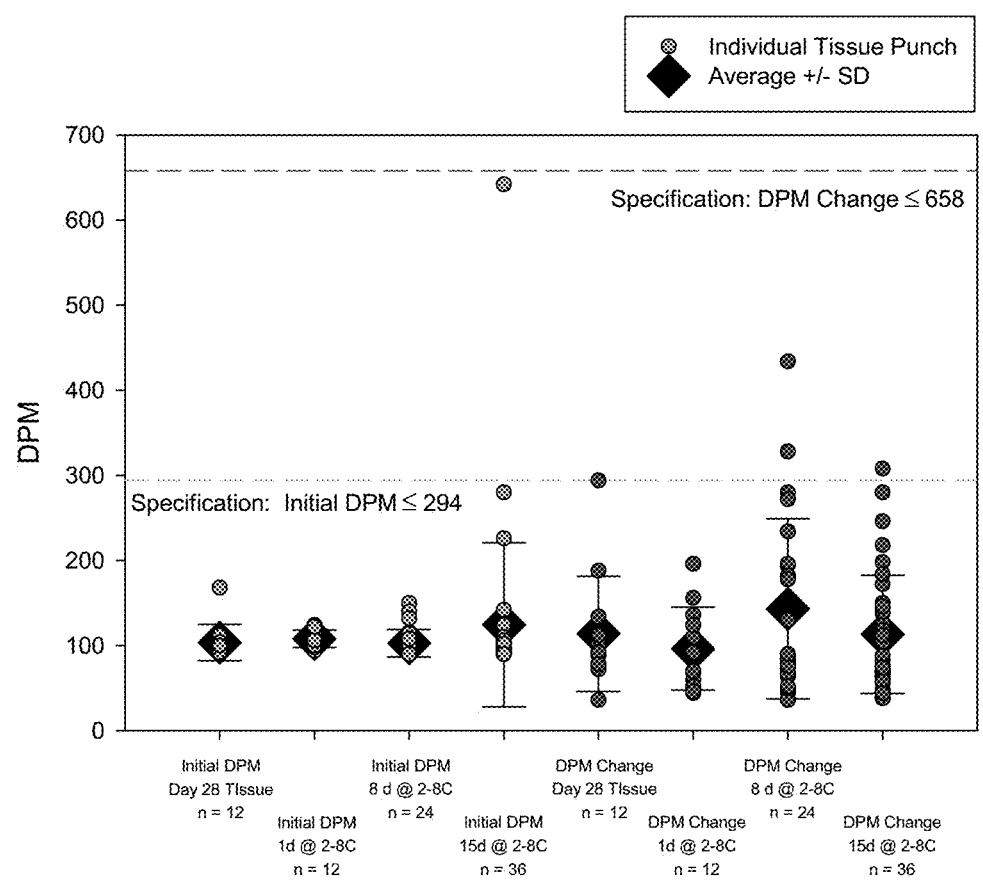
FIG. 6 is a viability data graft.

Barrier Function:

Barrier function data is presented below in Tables 10 and 11 and in FIG. 5. The acceptance criteria for barrier function are all readings must have an initial DPM value ≤294 and a DPM change over a 10 second interval ≤658.

All STRATAGRAFT® skin tissues stored at 2-8° C. for 1 day and 8 days met the barrier function acceptance criteria. There was a single reading (gray shade in Table 11) from a tissue stored at 2-8° C. for 15 days that exhibited an unacceptably high initial DPM value. All other readings from tissues stored for 15 days met the acceptance criteria. This high initial DPM value could have been caused by an accumulation of condensation on the surface of the tissue during storage, which is commonly seen in tissues stored at 2-8° C. With the exception of this single high reading, the barrier function of all stored tissues was comparable to the Day 28 QC tissues. This data demonstrated that increasing the duration of storage at 2-8° C. does not adversely affect tissue barrier function.

TABLE 10

Barrier Function Summary Table

| Lot | Initial DPM | DPM Change |
|---|---|---|
| *Day 28 Tissue* | | |
| Lot 025 Tissue 1 | 113 | 130 |
| Lot 027 Tissue | 96 | 99 |
| Lot 028 Tissue | 102 | 113 |
| Three lots (3 tissues) | 104 | 114 |
| *StrataGraft ™ Skin Tissue Storage 1 d @ 2-8° C.* | | |
| Lot 025 (3 tissues) | 108 | 96 |
| One lot (3 tissues) | 108 | 96 |
| *StrataGraft ™ Skin Tissue Storage 8 d @ 2-8° C.* | | |
| Lot 027 (3 tissues) | 98 | 70 |
| Lot 028 (3 tissues) | 108 | 216 |
| Two lots (6 tissues) | 103 | 143 |
| *StrataGraft ™ Skin Tissue Storage 15 d @ 2-8° C.* | | |
| Lot 025 (3 tissues) | 100 | 87 |
| Lot 027 (3 tissues) | 165 | 181 |
| Lot 028 (3 tissues) | 108 | 72 |
| Three lots (9 tissues) | 124 | 113 |

TABLE 11

Barrier Function Individual Values

*Day 28 QC Tissue*

| Tissue | Location | Initial | DPM Change |
|---|---|---|---|
| Lot 025 Tissue 1 | Center | 90 | 36 |
| | Edge | 102 | 102 |
| | Edge | 92 | 88 |
| | Edge | 168 | 294 |
| Lot 027 Tissue 4 | Center | 90 | 134 |
| | Edge | 100 | 112 |
| | Edge | 94 | 72 |
| | Edge | 98 | 78 |
| Lot 028 Tissue 4 | Center | 112 | 92 |
| | Edge | 92 | 92 |
| | Edge | 104 | 78 |
| | Edge | 100 | 188 |

*StrataGraft ™ Skin Tissue Storage 1 d @ 2-8° C.*

| Tissue | Location | Initial | DPM Change |
|---|---|---|---|
| Lot 025 Tissue 2 | Center | 94 | 68 |
| | Edge | 98 | 60 |
| | Edge | 124 | 156 |
| | Edge | 102 | 44 |
| Lot 025 Tissue 3 | Center | 98 | 52 |
| | Edge | 114 | 110 |
| | Edge | 122 | 70 |
| | Edge | 108 | 92 |

TABLE 11-continued

Barrier Function Individual Values

| | | | |
|---|---|---|---|
| Lot 025 Tissue 4 | Center | 100 | 46 |
| | Edge | 106 | 196 |
| | Edge | 106 | 136 |
| | Edge | 122 | 124 |

StrataGraft™ Skin Tissue Storage 8 d @ 2-8° C.

| | | DPM | |
|---|---|---|---|
| Tissue | Location | Initial | Change |
| Lot 027 Tissue 1 | Center | 94 | 64 |
| | Edge | 90 | 44 |
| | Edge | 90 | 74 |
| | Edge | 94 | 64 |
| Lot 027 Tissue 2 | Center | 98 | 68 |
| | Edge | 108 | 46 |
| | Edge | 114 | 80 |
| | Edge | 90 | 36 |
| Lot 027 Tissue 3 | Center | 90 | 50 |
| | Edge | 106 | 178 |
| | Edge | 98 | 84 |
| | Edge | 98 | 52 |
| Lot 028 Tissue 1 | Center | 94 | 194 |
| | Edge | 150 | 280 |
| | Edge | 140 | 328 |
| | Edge | 96 | 272 |
| Lot 028 Tissue 2 | Center | 102 | 76 |
| | Edge | 132 | 234 |
| | Edge | 94 | 130 |
| | Edge | 94 | 196 |
| Lot 028 Tissue 3 | Center | 94 | 90 |
| | Edge | 100 | 182 |
| | Edge | 90 | 178 |
| | Edge | 108 | 434 |

StrataGraft™ Skin Tissue Storage 15 d @ 2-8° C.

| | | DPM | |
|---|---|---|---|
| Tissue | Location | Initial | Change |
| Lot 025 Tissue 5 | Center | 94 | 44 |
| | Edge | 112 | 38 |
| | Edge | 92 | 66 |
| | Edge | 98 | 56 |
| Lot 025 Tissue 6 | Center | 102 | 76 |
| | Edge | 104 | 60 |
| | Edge | 112 | 172 |
| | Edge | 96 | 198 |
| Lot 025 Tissue 7 | Center | 90 | 64 |
| | Edge | 96 | 104 |
| | Edge | 94 | 82 |
| | Edge | 112 | 88 |
| Lot 027 Tissue 5 | Center | 94 | 138 |
| | Edge | 100 | 218 |
| | Edge | 110 | 126 |
| | Edge | 124 | 144 |
| Lot 027 Tissue 6 | Center | 98 | 114 |
| | Edge | 280 | 308 |
| | Edge | 94 | 150 |
| | Edge | 92 | 140 |
| Lot 027 Tissue 7 | Center | 96 | 184 |
| | Edge | 642 | 118 |
| | Edge | 106 | 246 |
| | Edge | 142 | 280 |
| Lot 028 Tissue 4 | Center | 110 | 62 |
| | Edge | 104 | 112 |
| | Edge | 106 | 70 |
| | Edge | 92 | 48 |
| Lot 028 Tissue 5 | Center | 90 | 68 |
| | Edge | 98 | 68 |
| | Edge | 226 | 146 |
| | Edge | 98 | 70 |
| Lot 028 Tissue 7 | Center | 90 | 58 |
| | Edge | 94 | 38 |
| | Edge | 102 | 44 |
| | Edge | 90 | 74 |

Histology:

In general, tissues stored at 2-8° C. for 15 days exhibited typical histological architecture, consisting of a dermis containing fibroblasts and an epidermis containing all required tissue layers.

Conclusions:

The results of this study demonstrate that STRATAGRAFT® tissue stored at 2-8° C. for up to 15 days meets the lot-release criteria for STRATAGRAFT® tissue. In general, the barrier function was not adversely affected by increasing the storage duration to 15 days. The viability of tissues stored at 2-8° C. for 15 days met the acceptance criteria for STRATAGRAFT® tissue. Tissues stored for 15 days also met the acceptance criteria for histology.

Example 6

This example describes how the shipping chambers and sterile packages for shipping are made.

A solution of 3% agarose is prepared by mixing 45 g agarose in 1455 ml water. The mixture is stirred and then autoclaved (121 C for 60 min.) to dissolve the agarose. 2× media solution is prepared by mixing in 1455 ml water: 24 g F12 media powder, 10.0 g DMEM media powder and 7.2 g HEPES powder. The mixture is stirred until all powder is dissolved and the pH is adjusted to 7.3 to 7.5. The 2× media solution and 3% agarose solution are placed in 40 C water baths for 30-60 minutes. The 2× media solution is then sterile-filtered and aseptically added to the 3% agarose solution though a Sterivex™ filter. 60 ml of the resulting solution is then aseptically dispensed into a sterile p150 culture dish (150 mm×20 mm circular tissue culture dish) and allowed to gel. If not immediately used, shipping chambers are packed into a heat sealable sterile bag for storage until use. For shipping, a skin equivalent in a Transwell insert (7.5 cm diameter (44 cm$^2$), pore size 0.4 micron) is aseptically placed on the agarose in the shipping chamber and the p150 plate top is placed on the shipping chamber and secured under aseptic conditions. The shipping chamber is then placed in a sterile heat sealable pouch and sealed to provide a shipping package. The shipping package is stored and shipped at 2-8 C, and is storable at the site of use at 2-8 C for 8-15 days from the time of packaging until immediately prior to the time of use. The integrity of the package may be maintained until the time of use and revival of the skin equivalent prior to use is not necessary.

Example 7

This example describes a simplified method for the production of skin equivalents.

Media.

The organotypic culture process uses three different culture media, all based on the formulation of SMB medium described in U.S. Pat. No. 7,407,805, with the exception that cholera toxin is omitted from all media. FM01 is used to propagate the normal human dermal fibroblasts (NHDFs) for use in skin equivalent dermal equivalent layers. FM01 has the same formulation as SMB except that it contains Fetal Clone II serum (2% final) and lacks cholera toxin. KM01 is used to grow NIKS® keratinocytes and has the same composition as SMB except that it contains 2.5% fetal clone II, and additional epidermal growth factor (EGF) is added to a final concentration of 5 ng/ml. SM01 is used during the epidermal stratification phase of skin equivalent production and is identical to SMB except for the omission of cholera toxin.

Dermal Equivalent Preparation.

On day 0, frozen NHDF cells are thawed and plated. The cells are fed FM01 the next day (day 1) to remove residual cryoprotectant and again on day 3. On day 4, they are harvested for use in the dermal equivalent. To prepare the dermal equivalent, Type I rat-tail collagen is first diluted to 3 mg/ml in 0.03N acetic acid and chilled on ice. A mixture of concentrated Ham's F12 medium (8.7× normal strength and buffered with HEPES at pH 7.5) is mixed with fetal clone II. These two solutions are 11.3 and 9.6% of the final solution volume. 1N NaOH is added to the medium mixture (2.4% of final solution). The diluted collagen is then added (74.7%) to the mixture. A 2% volume of suspended fibroblasts ($2.78 \times 10^6$/ml) is added to the mixture. 9 ml of the final dermal equivalent mixture is poured into each 75 mm TRANSWELL insert (Corning Costar). After a 50-70 minute gel formation period, the Transwell inserts are transferred to the surface of a stainless steel mesh in a 150 mm culture dish. 80 ml of FM01 is placed in the 150 mm dish outside the TRANSWELL insert and 10 ml is placed on top of the dermal equivalent. The dermal equivalents are placed in 37° C., 5% $CO_2$, 90% relative humidity incubator for 4-5 days prior to use in the organotypic cultures.

NIKS® Growth and Seeding.

NIKS® cells are thawed and plated at a density of approximately $5 \times 10^5$ cells per 100 mm dish. NIKS® culture can be performed in the presence or absence of murine feeder cells. On day 1, the NIKS® cells are fed fresh KM01 to remove residual cryoprotectant. The NIKS® cells are fed again on day 3. On day 4, the NIKS® cells are harvested from the initial p100 cultures and seeded into 225 $cm^2$ culture flasks at a density of $1.2 \times 10^6$ per flask. The NIKS® cultures are fed fresh medium on Days 7 and 8. On day 9, the NIKS® cells are harvested, counted, and resuspended in SM01. $2.27 \times 10^4$ NIKS® cells/$cm^2$ are seeded onto the surface of the dermal equivalents. The dishes are cultures are fed and lifted to the air-medium interface. Cultures are transferred to a controlled humidity incubator set to 75% where they remain for the rest of their growth. Cultures are fed SM01 on days 14, 18, 22, 25, 28, and 30.

Example 8

Storage of STRATAGRAFT® skin tissues produced using simplified procedures on shipping chambers for up to 15 days is highly desirable as it would enhance the availability of the tissue for clinical use. This example demonstrates that storage of skin equivalents produced using simplified procedures on nutrient-agarose shipping chambers for up to 15 days at 2-8° C. is acceptable.

Experimental Design:

STRATAGRAFT® tissues produced at Stratatech's process development laboratory were packaged onto nutrient-agarose shipping chambers on Day 31 of the production process and stored at approximately 2-8° C. for 8 or 15 days. Tissues were analyzed for viability, barrier function, and histology after the indicated storage periods.

Results:

Viability:

The viability data from this study are shown in FIG. 7. STRATAGRAFT® skin tissues stored for either 8 or 15 days met the acceptance criteria for viability. Tissue viability decreased as the storage period was increased. Nevertheless, the viability values were highly consistent, and all values easily surpassed the lower limit.

Barrier Function:

Barrier function data are presented below in FIG. 8. All STRATAGRAFT® skin tissues stored at 2-8° C. for 8 day or 15 days met the barrier function acceptance criteria. Although the initial DPM values and DPM change values increased slightly as storage was increased, the barrier function was retained.

Histology:

In general, STRATAGRAFT® skin tissues stored at 2-8° C. for 8 or 15 days exhibited all of the typical epidermal layers atop the collagen dermis containing fibroblasts. Several common storage-related effects were seen in these tissues including an increase in the number of condensed nuclei and a reduction in the eosin staining in the upper epidermal layers.

Conclusions:

This study demonstrates that STRATAGRAFT® skin tissues stored for 8 or 15 days at 2-8° C. have acceptable viability, barrier function, and histology.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention that are obvious to those skilled in molecular biology, biochemistry, or related fields are intended to be within the scope of the following claims.

We claim:

1. A kit comprising: a shipping chamber comprising a gel support comprising a minimal media; an organotypically cultured skin equivalent supported on a permeable membrane in contact with said gel support; wherein said shipping chamber is contained with a sealed, sterile pouch and lacks any liquid on its packaging date.

2. The kit of claim 1, wherein said organotypically cultured skin equivalent comprises NIKS cells.

3. The kit of claim 1, wherein said gel support is an agarose gel support.

4. The kit of claim 1, wherein said sterile pouch is heat sealable.

5. The kit of claim 1, wherein said skin equivalent contacts said gel support via said permeable membrane.

6. The kit of claim 1, wherein said organotypically cultured skin equivalent comprises NIKS cells.

7. The kit of claim 1, wherein said organotypically cultured skin equivalent, on the packaging date of the chamber and after storage of the packaged chamber for 8 days at 2-8 degrees Celsius, has an initial barrier function value of ≤294 DPM and a second barrier function value of ≤658 DPM, when the second barrier function value is measured 10 seconds after the initial barrier function value.

8. The kit of claim 7, wherein said organotypically cultured skin equivalent comprises NIKS cells.

9. The kit of claim 1, wherein said organotypically cultured skin equivalent, on the packaging date of the chamber and after storage of the packaged chamber for 15 days at 2-8 degrees Celsius, has an initial barrier function value of ≤294 DPM and a second barrier function value of ≤658 DPM, when the second barrier function value is measured 10 seconds after the initial barrier function value.

10. The kit of claim 9, wherein said organotypically cultured skin equivalent comprises NIKS cells.

11. The kit of claim 1, wherein said organotypically cultured skin equivalent, on the packaging date of the chamber and after storage of the packaged chamber for 25 days at 2-8 degrees Celsius, has an initial barrier function value of ≤294 DPM and a second barrier function value of ≤658 DPM, when the second barrier function value is measured 10 seconds after the initial barrier function value.

12. The kit of claim 11, wherein said organotypically cultured skin equivalent comprises NIKS cells.

13. An article comprising a shipping chamber having a chamber top and a chamber bottom, the chamber bottom having a surface having thereon a gel support, wherein the gel support comprises a minimal media, said article further comprising an organotypically cultured skin equivalent on a permeable membrane, said permeable membrane in contact with said gel support, said article further comprising extensions extending from said chamber top so that when said chamber top is placed on said chamber bottom said skin equivalent is secured against said gel support, wherein the chamber bottom lacks any liquid at the time of manufacture.

* * * * *